US007357306B2

(12) United States Patent
Ma et al.

(10) Patent No.: US 7,357,306 B2
(45) **Date of Patent: *Apr. 15, 2008**

(54) MULTIPLE SHEET DETECTOR APPARATUS AND METHOD

(75) Inventors: Songtao Ma, Wadsworth, OH (US); Edward L. Laskowski, Seven Hills, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/171,647

(22) Filed: Jun. 30, 2005

(65) Prior Publication Data

US 2006/0000888 A1 Jan. 5, 2006

Related U.S. Application Data

(60) Provisional application No. 60/585,303, filed on Jul. 1, 2004.

(51) Int. Cl.

| | |
|---|---|
| ***G06Q 40/00*** | (2006.01) |
| ***G07D 11/00*** | (2006.01) |
| ***G07F 19/00*** | (2006.01) |

(52) U.S. Cl. ...................................... 235/379; 235/375

(58) Field of Classification Search ................ 235/379, 235/381, 375; 271/3.14; 705/16
See application file for complete search history.

(56) References Cited

U.S. PATENT DOCUMENTS

| | | | | |
|---|---|---|---|---|
| 5,945,602 | A * | 8/1999 | Ross | 73/570 |
| 2003/0006550 | A1 * | 1/2003 | Chujo et al. | 271/262 |
| 2004/0075213 | A1 * | 4/2004 | Obama et al. | 271/258.01 |

* cited by examiner

*Primary Examiner*—Lisa Caputo
(74) *Attorney, Agent, or Firm*—Christopher L. Parmelee; Ralph E. Jocke; Walker & Jocke LPA

(57) ABSTRACT

A detector for a deposit accepting apparatus of an automated banking machine includes an ultrasonic transmitter driven by a driving signal operative to cause the ultrasonic transmitter to transmit an ultrasonic sound signal through a sheet pathway of the detector. The detector also includes an ultrasonic receiver operative to generate a receiver signal responsive to the ultrasonic sound signal. The detector further includes first and second correlation filters. The first and second correlation filters are operative to generate first and second outputs responsive to the receiver signal. At least one processor is operative responsive to the first and second outputs of the correlation filters to determine information associated with changes in phase of the ultrasonic sound signal and to distinguish between single and multiple sheets in the pathway responsive to the information associated with changes in phase.

47 Claims, 18 Drawing Sheets

300

SAMPLE AT 2ms

| Original Outputs | | Adjusted Outputs | | Virtual Amplitude | Original Phase | | Reconstructed Phase | | | | Quadrant |
|---|---|---|---|---|---|---|---|---|---|---|---|
| V1 | V2 | Y1 | Y2 | | PH1 | PH2 | PH1 | PH2 | Y1 | Y2 | |
| 3.009 | 4.933 | 0.502 | 2.463 | 2.514 | 1.370 | 0.201 | 1.370 | -0.201 | + | + | I |
| 310 | 312 | 314 | 316 | 308 | 302 | 306 | 304 | 308 | 318 | 320 | |

FIG-20

400

TABLE 1: PHASE RECONSTRUCTION TABLE

| Quadrant | Cycle | $Y_1$ | $Y_2$ | $\Phi_1$ | $\Phi_2$ | Indicator |
|---|---|---|---|---|---|---|
| $III^{-1}$ | -1 | - | - | $-\varphi_1$ | $-\varphi_2 - 2\pi$ | $\varphi_1 + \varphi_2 = 3\pi/2$ |
| $IV^{-1}$ | -1 | + | - | $-\varphi_1$ | $-\varphi_2$ | $\varphi_1 - \varphi_2 = -\pi/2$ |
| I | 0 | + | + | $\varphi_1$ | $-\varphi_2$ | $\varphi_1 + \varphi_2 = \pi/2$ |
| II | 0 | - | + | $\varphi_1$ | $\varphi_2$ | $\varphi_1 - \varphi_2 = \pi/2$ |
| III | 0 | - | - | $2\pi - \varphi_1$ | $\varphi_2$ | $\varphi_1 + \varphi_2 = 3\pi/2$ |
| IV | 0 | + | - | $2\pi - \varphi_1$ | $2\pi - \varphi_2$ | $\varphi_1 - \varphi_2 = -\pi/2$ |
| $I^{+1}$ | 1 | + | + | $2\pi + \varphi_1$ | $2\pi - \varphi_2$ | $\varphi_1 + \varphi_2 = \pi/2$ |
| $II^{+1}$ | 1 | - | + | $2\pi + \varphi_1$ | $2\pi + \varphi_2$ | $\varphi_1 - \varphi_2 = \pi/2$ |
| $III^{+1}$ | 1 | - | - | $4\pi - \varphi_1$ | $2\pi + \varphi_2$ | $\varphi_1 + \varphi_2 = 3\pi/2$ |
| $IV^{+1}$ | 1 | + | - | $4\pi - \varphi_1$ | $4\pi - \varphi_2$ | $\varphi_1 - \varphi_2 = -\pi/2$ |
| $I^{+2}$ | 2 | + | + | $6\pi - \varphi_1$ | $4\pi - \varphi_2$ | $\varphi_1 + \varphi_2 = \pi/2$ |

403 408 402 404 406 484 480 482 420

FIG-22

418 419 410 412 411 413 414 416

| Time(ms) | Original Outputs V1 | Original Outputs V2 | Adjusted Outputs Y1 | Adjusted Outputs Y2 | Virtual Amplitude | Original Phase PH1 | Original Phase PH2 | Reconstructed Phase PH1 | Reconstructed Phase PH2 | Signs Y1 | Signs Y2 | Quadrant |
|---|---|---|---|---|---|---|---|---|---|---|---|---|
| 102 | 3.858 | 4.923 | 1.351 | 2.454 | 2.801 | 1.067 | 0.503 | 1.067 | -0.503 | + | + | I |
| 103 | 3.683 | 4.930 | 1.175 | 2.461 | 2.727 | 1.125 | 0.446 | 1.125 | -0.446 | + | + | I |
| 104 | 3.394 | 4.933 | 0.887 | 2.463 | 2.618 | 1.225 | 0.346 | 1.225 | -0.346 | + | + | I |
| 105 | 2.625 | 4.923 | 0.118 | 2.454 | 2.456 | 1.523 | 0.048 | 1.523 | -0.048 | + | + | I |
| 106 | 1.612 | 4.928 | -0.895 | 2.459 | 2.616 | 1.920 | 0.349 | 1.920 | 0.349 | - | + | II |
| 107 | 1.253 | 4.928 | -1.254 | 2.459 | 2.760 | 2.043 | 0.472 | 2.043 | 0.472 | - | + | II |
| 108 | 0.989 | 4.923 | -1.518 | 2.454 | 2.885 | 2.125 | 0.554 | 2.125 | 0.554 | - | + | II |
| 109 | 1.084 | 4.928 | -1.423 | 2.459 | 2.841 | 2.095 | 0.525 | 2.095 | 0.525 | - | + | II |
| 110 | 1.233 | 4.532 | -1.274 | 2.063 | 2.425 | 2.124 | 0.553 | 2.124 | 0.553 | - | + | II |
| 111 | 1.468 | 3.346 | -1.039 | 0.876 | 1.359 | 2.441 | 0.870 | 2.441 | 0.870 | - | + | II |
| 112 | 1.844 | 2.667 | -0.663 | 0.197 | 0.692 | 2.853 | 1.282 | 2.853 | 1.282 | - | + | II |
| 113 | 2.266 | 2.349 | -0.241 | -0.120 | 0.269 | 2.679 | 2.034 | 3.605 | 2.034 | - | - | III |
| 114 | 2.596 | 2.332 | 0.089 | -0.137 | 0.164 | 0.997 | 2.568 | 5.286 | 3.715 | + | - | IV |
| 115 | 2.801 | 2.449 | 0.294 | -0.020 | 0.295 | 0.068 | 1.639 | 6.215 | 4.644 | + | - | IV |
| 116 | 2.830 | 2.650 | 0.323 | 0.180 | 0.370 | 0.508 | 1.062 | 6.792 | 5.221 | + | + | I+1 |
| 117 | 2.723 | 2.767 | 0.216 | 0.297 | 0.367 | 0.943 | 0.628 | 7.226 | 5.656 | + | + | I+1 |
| 118 | 2.576 | 2.779 | 0.069 | 0.310 | 0.317 | 1.351 | 0.220 | 7.634 | 6.063 | + | + | I+1 |
| 119 | 2.488 | 2.659 | -0.019 | 0.190 | 0.191 | 1.669 | 0.098 | 7.952 | 6.381 | - | + | II+1 |
| 120 | 2.466 | 2.540 | -0.041 | 0.070 | 0.081 | 2.096 | 0.525 | 8.379 | 6.808 | - | + | II+1 |
| 121 | 2.515 | 2.479 | 0.008 | 0.009 | 0.012 | 0.844 | 0.727 | 7.127 | 5.556 | + | + | I+1 |
| 122 | 2.554 | 2.410 | 0.047 | -0.059 | 0.076 | 0.897 | 2.468 | 5.386 | 3.815 | + | - | IV |
| 123 | 2.601 | 2.405 | 0.094 | -0.064 | 0.113 | 0.600 | 2.171 | 5.683 | 4.112 | + | - | IV |
| 124 | 2.628 | 2.405 | 0.121 | -0.064 | 0.136 | 0.489 | 2.059 | 5.795 | 4.224 | + | - | IV |
| 125 | 2.664 | 2.427 | 0.157 | -0.042 | 0.163 | 0.262 | 1.833 | 6.021 | 4.451 | + | - | IV |
| 126 | 2.694 | 2.501 | 0.186 | 0.031 | 0.189 | 0.166 | 1.405 | 6.449 | 4.878 | + | + | I+1 |
| 127 | 2.635 | 2.562 | 0.128 | 0.092 | 0.158 | 0.625 | 0.946 | 6.908 | 5.337 | + | + | I+1 |
| 128 | 2.567 | 2.549 | 0.059 | 0.080 | 0.100 | 0.932 | 0.639 | 7.215 | 5.644 | + | + | I+1 |

420 424 430 434 450 454 460 464 470 474 422 426 432 436 452 456 462 466 472 476

FIG-23

MULTIPLE SHEET DETECTOR APPARATUS AND METHOD

CROSS REFERENCE TO RELATED APPLICATIONS

This application claims benefit of U.S. Provisional Application Ser. No. 60/585,303 filed Jul. 1, 2004 pursuant to 35 U.S.C. 119 (e), the disclosure of which is hereby incorporated herein by reference.

TECHNICAL FIELD

This invention relates to an apparatus capable of distinguishing single sheets from multiple sheets. Specifically this invention relates to an automated banking machine or other system which includes a detector capable of using ultrasonic sound waves to distinguishing single sheets from multiple, folded or overlapped sheets.

BACKGROUND ART

Automated banking machines are known in the prior art. Automated banking machines are commonly used to carry out transactions such as dispensing cash, checking account balances, paying bills and/or receiving deposits from users. Other types of automated banking machines may be used to purchase tickets, to issue coupons, to present checks, to print scrip and/or to carry out other functions either for a consumer or a service provider. For purposes of this description any device which is used for carrying out transactions involving transfers of value shall be referred to as an automated banking machine.

Automated banking machines often have the capability of accepting deposits from users. Such deposits may include items such as envelopes containing checks, credit slips, currency, coin or other items of value. Mechanisms have been developed for receiving such items from the user and transporting them into a secure compartment within the banking machine. Periodically a service provider may access the interior of the machine and remove the deposited items. The content and/or value of the deposited items are verified so that a credit may be properly applied to an account of the user or other entity on whose behalf the deposit has been made. Such depositories often include printing devices which are capable of printing identifying information on the deposited item. This identifying information enables the source of the item to be tracked and credit for the item correlated with the proper account after the item is removed from the machine.

Many automated banking machines accept deposits from users in envelopes. Because the contents of the envelope are not verified at the time of deposit, the user's account cannot be credited for the deposit until the envelope is retrieved from the machine and the contents thereof verified. Often this must be done by persons who work for a financial institution. Delays in crediting a user's account may be experienced due to delays in removing deposits from machines, as well as the time it takes to review deposited items and enter appropriate credits. If the deposited items include instruments such as checks, further delays may be experienced. This is because after the instruments are removed from the machine they must be presented for payment to the appropriate institution. If the instrument is not honored or is invalid the depositing customer's account cannot be credited for the deposit. Alternatively in situations where a credit has been made for a deposited instrument that is subsequently dishonored, the user's account must be charged the amount of the credit previously given. In addition the user commonly incurs a "bad check" fee due to the cost associated with the institution having to handle a dishonored deposit. All of these complications may result in delays and inconvenience to the user.

Another risk associated with conventional depositories in automated banking machines is that deposited items may be misappropriated. Because deposited checks and other instruments are not cancelled at the time of receipt by the automated banking machine, they may be stolen from the machine and cashed by unauthorized persons. Criminals may attempt to break into the machine to obtain the items that have been stored in the depository. Alternatively persons responsible for transporting items from the machine or persons responsible for verifying the items may misappropriate deposited instruments and currency. Alternatively the handling required for transporting and verifying the contents of deposits may result in deposited instruments being lost. Such circumstances can result in the user not receiving proper credit for deposited items.

To reduce many of the drawbacks associated with conventional depositories, which receive deposits in the form of envelopes or other items, automated devices that can read and cancel deposited instruments have been developed. An example of such a device is shown in U.S. Pat. No. 5,540,425 which is hereby incorporated herein by reference. Such devices are capable of reading the coding on checks or other deposited items. For example, bank checks include magnetic ink coding commonly referred to as "micr." The micr coding on a check can be used to identify the institution upon which the check is drawn. The coding also identifies the account number of the issuer of the check and the check number. This coding commonly appears in one or several areas on the instrument. Reading this coding in the automated banking machine enables the machine operator to determine the source of checks or other instruments that have been presented.

Imaging devices may also be used in processing instruments. Such imaging devices may be used to produce data corresponding to an image of the item that has been deposited. This image may be reviewed to determine the nature of the deposited item, and along with the information that can be obtained from the coding on the instrument allows processing of the credit to the user much more readily. Automated instrument processing systems also may provide the capability of printing an indication that the check or other instrument has been deposited and cancelled after it has been received. This reduces the risk that the instrument will subsequently be misappropriated and cashed by unauthorized persons.

While automated deposit accepting and processing devices provide many advantages and benefits, existing devices may also have drawbacks. One drawback is that an instrument deposited by a customer may correspond to two or more overlapped sheets rather than a single sheet. If the extra sheet(s) are not detected by the machine, there exists the possibility that one or more of the extra sheets may never be processed and/or may be processed only after a significant delay.

Mechanical sensors may be employed to determine when multiple overlapped sheets have been deposited. Such mechanical sensors may measure the thickness of the deposited item and based on the measurement determine if the item corresponds to more than one overlapped sheet.

However, mechanical measurement to distinguish a single sheet from multiple overlapped sheets may not be accurate if the thickness of the items being measured are not uniform. For example, checks are often printed by various different entities and may have significant variations in thickness. As a result, a relatively thick single check may have a thickness which corresponds to two overlapped relatively thinner checks. Mechanical sensors measuring the thickness of the deposited item may incorrectly identify the relatively thick single check as being two overlapped checks (referred to herein as a double).

Consequently there exists a need for a sensor in an automated banking machine which is operative to accurately distinguish between single sheets and multiple overlapped sheets which are deposited in the machine. In addition, there exists a need to distinguish between single sheets and multiple sheets deposited in an automated banking machine where the sheets have a wide variation in thicknesses such as with checks.

DISCLOSURE OF INVENTION

It is an object of a form of the present invention to provide an apparatus and method of distinguishing single sheets from multiple overlapped sheets.

It is a further object of a form of the present invention to provide an automated banking machine at which a customer may conduct transactions.

It is a further object of a form of the present invention to provide an automated banking machine that is operative to accept items of value deposited by the customer.

It is a further object of a form of the present invention to provide an automated banking machine that is operative to accept checks deposited by the customer.

It is a further object of a form of the present invention to provide an automated banking machine that is operative to determine if a deposited item corresponds to a single sheet or multiple overlapped sheets.

It is a further object of a form of the present invention to provide an automated banking machine that is operative to determine if a deposited item corresponds to a single check or multiple overlapped checks.

Further objects of forms of the present invention will be made apparent in the following Best Modes for Carrying Out Invention and the appended claims.

The foregoing objects may be accomplished in an example embodiment by an automated banking machine that includes output devices such as a display screen and receipt printer. The machine may further include input devices such as a touch screen, keyboard, keypad, function keys, and card reader. The automated banking machine may further include transaction function devices such as a cash dispenser mechanism for sheets of currency, a depository mechanism and other transaction function devices which are used by the machine in carrying out banking transactions including transfers of value. The computer may be in operative connection with the output devices and the input devices, as well as with the cash dispenser mechanism, depository mechanism and other physical transaction function devices in the banking machine. The computer may further be operative to communicate with a host system located remotely from the machine.

In an embodiment of the machine, the computer may include software programs that are executable therein. The software programs of the automated banking machine may be operative to cause the computer to output user interface screens through a display device of the machine. The user interface screens may include customer screens which provide a customer with information for performing customer operations such as banking functions with the machine. The user interface screens may further include service screens which provide an authorized user servicing the machine with information for performing service and maintenance operations with the machine. In addition the machine may further include software programs operative in the computer for controlling and communicating with hardware devices of the machine including the transaction function devices.

In an embodiment, the automated banking machine may include a depository mechanism referred to herein as a sheet or deposit accepting apparatus which is defined herein as any device that accepts one or more sheets such as checks, currency, documents, or other items provided to the machine by a customer. U.S. Pat. No. 6,554,185 B1 which is hereby incorporated by reference herein in its entirety shows an example of a deposit accepting apparatus which may be used in embodiments of the machine. Such a deposit accepting apparatus may include an inlet that is operative to accept checks or other items being deposited by a customer. Embodiments of the deposit accepting apparatus may be operative to acquire image and magnetic profile data from deposited checks or other items of value. Embodiments of the deposit accepting apparatus may also be operative to manipulate the image and profile data and to analyze and resolve characters in selected areas thereof. The data from the deposited item may be used for determining if the user is authorized to conduct certain requested transactions at the machine.

The automated banking machine and/or the deposit accepting apparatus may include a detector apparatus which may be used by the machine and/or the deposit accepting apparatus to determine if the deposited media corresponds to a single sheet or multiple overlapped sheets. The detector apparatus may be operative to transmit a sound signal through the deposited media. For example, the deposit accepting apparatus may include a transport which moves the media along a pathway. The detector apparatus may include an ultrasonic sound transmitter positioned on one side of the pathway and an ultrasonic sound receiver positioned on the opposite side of the pathway. Deposited sheet media such as a check may be moved by the transport in the gap between the ultrasonic transmitter and the ultrasonic receiver. The ultrasonic receiver may produce a receiver signal responsive to the ultrasonic sound signal received from the transmitter. The receiver signal may be filtered and analyzed by the detector to determine an amount of phase delay produced in the ultrasonic sound signal as a result of sheet media passing through the gap.

The detector apparatus may include orthogonal correlation filters. A first one of the correlation filters may be fed the receiver signal generated by the ultrasonic receiver and a first reference signal. The second one of the correlation filters may be fed the receiver signal and a second reference signal. The first and second reference signals for the filters may have a frequency which corresponds to the frequency of the originally transmitted ultrasonic sound signal. In addition, the second reference signals may have a phase which lags the phase of the first reference signal by $\pi/2$ radians (ninety degrees). As defined herein correlation filters correspond to circuits which are operative to provide output signals which include information regarding a difference in phase between a receiver signal and a reference signal. Also as defined herein, two correlation filters which receive respective reference signals which differ in phase by $\pi/2$ radians are referred to as orthogonal correlation filters. In an embodiment the orthogonal correlation filters are operative to output respective signals which include information regarding a phase differential between the receiver signal and the respective reference signals which range from 0 to π rad (0 to 180 degrees).

The outputs of the two correlation filters may be sampled at a frequency which is sufficiently high to distinguish the gradual change in phase over time of the ultrasonic sound signal from a time before the item passes through the gap between the transmitter and receiver to a time when portions of the item are passing through the gap between the transmitter and the receiver. By monitoring the gradual change in phase angle differentials reflected in both of the outputs of the correlation filters, the detector apparatus may be operative to reconstruct data representative of a phase delay greater than π radians (180 degrees) which may be produced by multiple overlapped sheets. The detector apparatus may be operative responsive to the reconstructed phase angles to reliably distinguish single sheets from double, triple and/or other multiples of sheets.

When the detector apparatus determines that media in the detector corresponds to multiple overlapped sheets, the deposit accepting apparatus may be operative to cause the transport of the apparatus to return the checks to the user through an opening in the ATM and/or to activate portions of the transport that may be operative to attempt to separate the overlapped checks. When the detector determines that the media corresponds to a single check, the automated banking machine may be operative through operation of the deposit accepting apparatus to cause a check depositing transaction to be performed.

In a example embodiment of the automate banking machine, the check depositing transaction may include initiating the crediting of an account associated with the user of the machine with an amount of value associated with the check. The check depositing transaction may further include moving the check with the transport into a reservoir for storing deposited checks.

BRIEF DESCRIPTION OF DRAWINGS

FIG. 20 is a table showing examples of data values measured and calculated associated with a single sample detected by the detector during a no-sheet condition of the detector.

FIG. 22 is a table showing information usable by the detector to determine reconstructed phase angles from calculated original phase angles.

FIG. 23 is a table showing examples of data values measured and calculated associated with a set of samples detected by the detector during a time period before a triple overlapped sheet reaches the detector to a time while the triple overlapped sheet is passing through the detector.

BEST MODES FOR CARRYING OUT INVENTION

Figure 1:
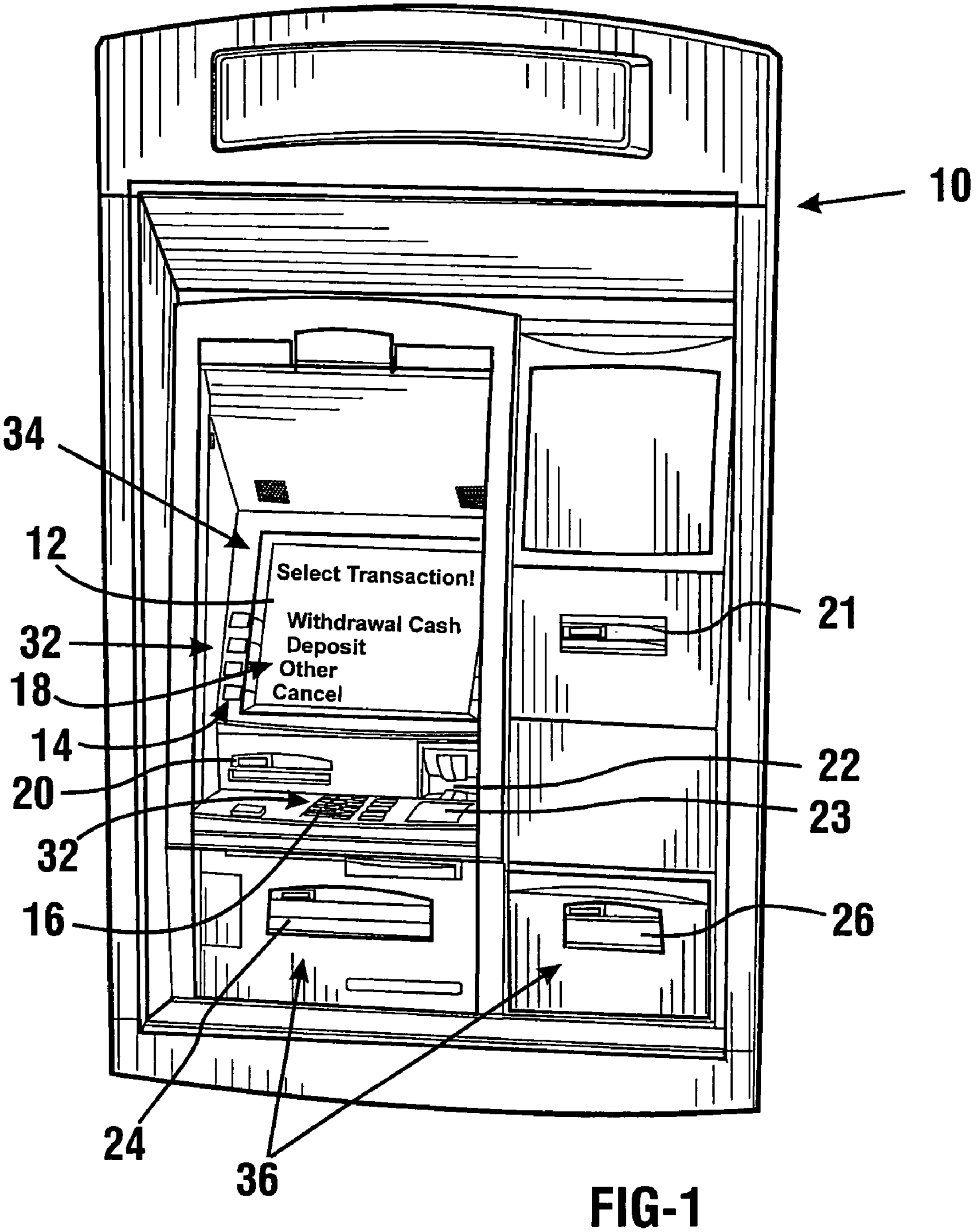
FIG. 1 is a perspective view representative of an example embodiment of an automated banking machine.

Referring now to the drawings and particularly to FIG. 1, there is shown therein a perspective view of an example embodiment of an automated banking machine 10. Here the automated banking machine 10 may include at least one output device 34 such as a display device 12. The display device 12 may be operative to provide a consumer with a user interface 18 that may include a plurality of screens or other outputs including selectable options for operating the machine. An embodiment of the automated banking machine may further include other types of output devices such as a receipt printer 20, statement printer 21, speakers, or any other type of device that is capable of outputting visual, audible, or other sensory perceptible information.

The example embodiment of the automated banking machine 10 may include a plurality of input devices 32 such as an encrypting pin pad with keypad 16 and function keys 14 as well as a card reader 22. The example embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The example embodiment of the automated banking machine 10 may further include a plurality of transaction function devices which may include for example a cash dispenser 24, a depository mechanism 26 (also referred to herein as a sheet or deposit accepting apparatus), cash recycler mechanism (which also corresponds to a deposit accepting apparatus), or any other type of device which is operative to perform transaction functions involving transfers of value.

Figure 2:
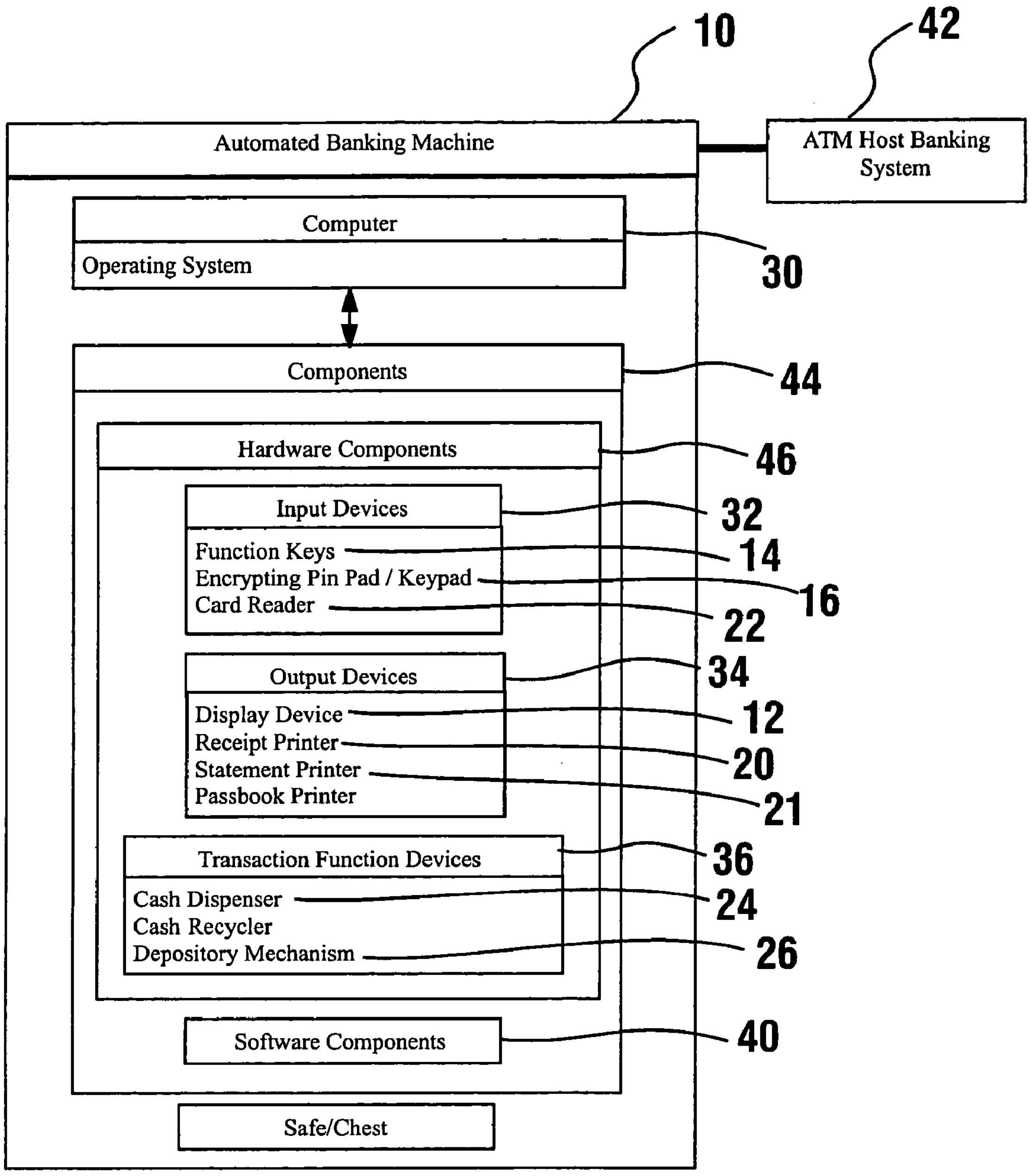
FIG. 2 is a schematic view of a further example embodiment of an automated banking machine.

FIG. 2 shows a schematic view of components which may be included in the automated banking machine 10. The machine 10 may include at least one computer 30. The computer 30 may be in operative connection with the input device(s) 32, the output device(s) 34, and the transaction function device(s) 36. The example embodiment may further include at least one terminal control software component 40 operative in the computer 30. The terminal control software components may be operative to control the operation of the machine by both a consumer and an authorized user such as a service technician. For example, such terminal control software components may include applications which enable a consumer to dispense cash, deposit a check, or perform other transaction functions with the machine. In addition the terminal control software components may include applications which enable a service technician to perform configuration, maintenance and diagnostic functions with the machine.

Embodiments of the automated banking machine 10 may be operative to communicate with a transaction processing server which is referred to herein as an ATM host banking system 42. Such an ATM host banking system 42 may be operative to authorize the automated banking machine 10 to perform transaction functions for users such as withdrawing cash from an account through operation of the cash dispenser 24, depositing checks or other items with the deposit accepting apparatus 26, performing a balance inquiry for a financial account and transferring value between accounts.

Figure 3:
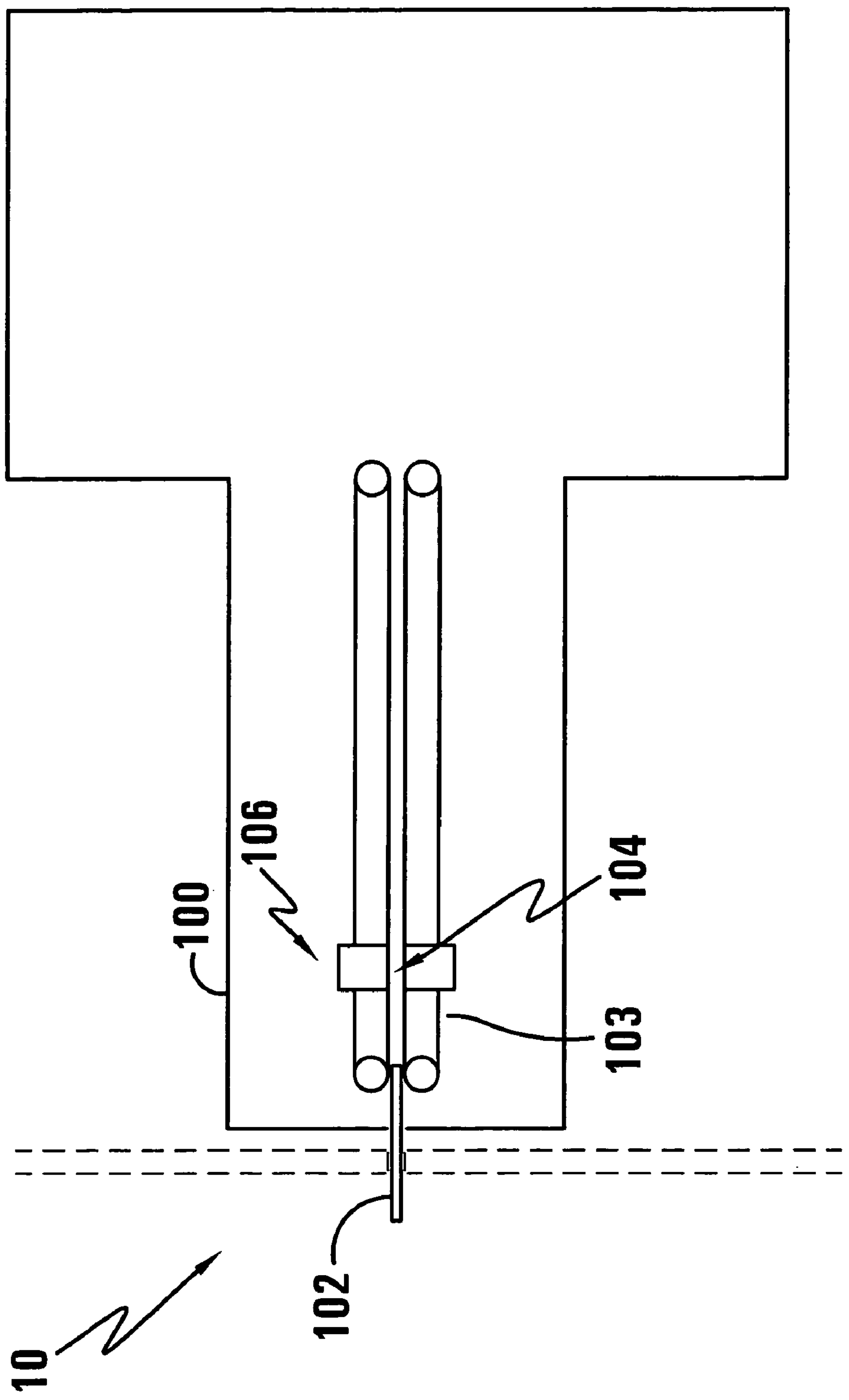
FIG. 3 is a cross-sectional view of an example embodiment of a deposit accepting apparatus with a detector apparatus operative to distinguish single sheets from multiple overlapped sheets.

FIG. 3 shows an example of a deposit accepting apparatus 100 for an embodiment of the automated banking machine 10. Here the deposit accepting apparatus 100 is operative to accept individual sheets such as checks 102, or other documents such as currency, vouchers, coupons, tickets or other items of value. The deposit accepting apparatus may include a transport 103 which moves a check inserted by a customer along a pathway 104 within the deposit accepting apparatus.

Figure 4:
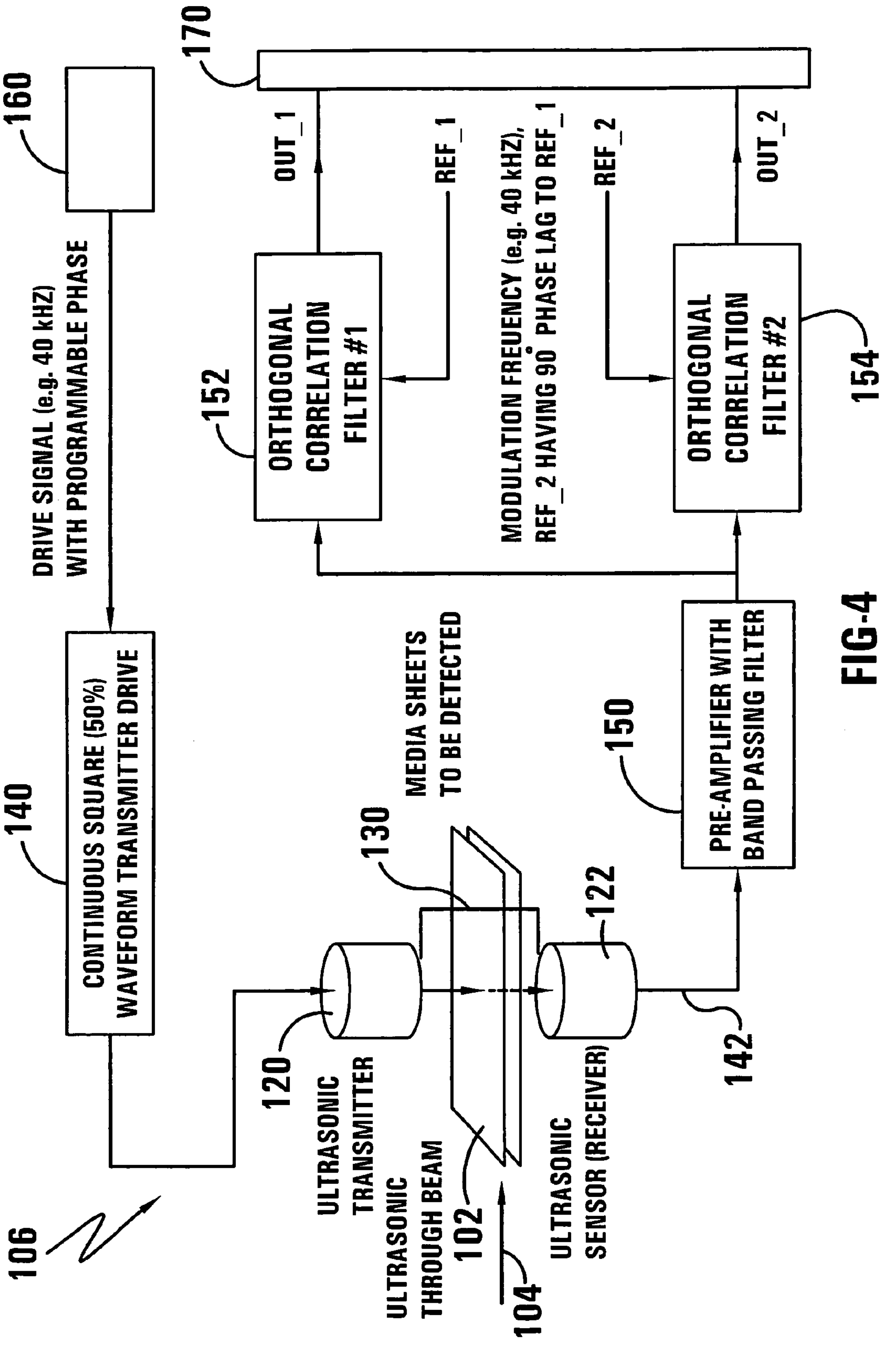
FIG. 4 is a schematic view of an example embodiment of an ultrasonic detector that is operative to distinguish single sheets from multiple overlapped sheets.

In this described embodiment, the deposit accepting apparatus may include a detector 106 adjacent the pathway which is operative to distinguish between single sheets and multiple overlapped sheets moving through the pathway. FIG. 4 shows a schematic view of the detector 106. Here the detector includes an ultrasonic sound transmitter 120 and an ultrasonic sound sensor or receiver 122. The transmitter and receiver may be spaced apart and positioned on opposite sides of the pathway 104 to form a gap 130 through which the sheet passes. The transmitter may be orientated to output an ultrasonic sound signal in a direction that traverses the gap. The receiver may be aligned with the transmitter on the opposite side of the gap so as to receive the ultrasonic sound signal after passing through the pathway and any sheets present in the gap. The receiver may be orientated to output the ultrasonic sound signal in a direction that is substantially perpendicular with respect to a plane which includes an upper or lower face of the sheet.

The acoustic impedance of the gap changes when sheets of paper such as checks are inserted into the gap. This change produces extra phase delay in the ultrasonic sound signal per inserted sheet layer, plus amplitude attenuation inversely proportional to the number of layers and the total thickness of the sheets. The number of overlapped sheets in the sensor gap may be determined from the amount of phase delay in the ultrasonic sound signal after passing through the sheet(s). Alternative embodiments of the detector may further base determinations as to the number of overlapped sheets on both phase delay and the attenuation of the ultrasonic sound signal.

In an example embodiment of the detector, a driving signal 140 applied to the transmitter 120 may have a square waveform with a 50% duty cycle. Also, in this described embodiment the driving signal may be 20V peak to peak with a frequency of about 40 kHz to produce a 40 kHz ultrasonic sound signal. However, in other alternative embodiments, driving signals with other waveforms, amplitudes, and frequencies may be used depending on the type of transmitter, expected range of properties of the sheet media, the acoustical characteristic of the detector and the desired acoustical characteristics of the ultrasonic sound signal. As used herein an ultrasonic sound signal is defined as a sound wave with a frequency greater than 20 kHz. However, it is to be understood that alternative embodiments may include detectors which operate using sound waves with frequencies at or lower than 20 kHz depending on the acoustical sound characteristics of the detector and sheet media being detected.

In embodiments of the detector, the receiver signal 142 produced by the receiver responsive to the ultrasonic sound signal received from the transmitter, may be conditioned using a pre-amplifier with band-passing filter 150. The conditioned receiver signal may be fed into first and second correlation filters 152,154 along with reference signals with known frequencies and phases.

Figure 5:
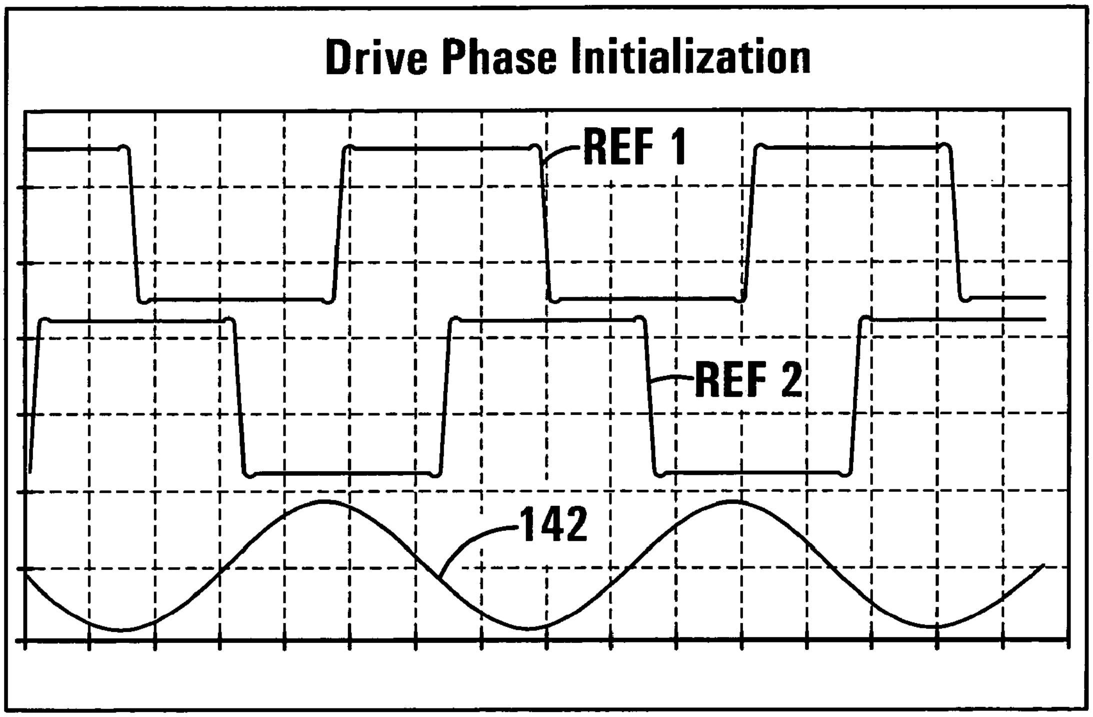
FIG. 5 is a graph showing examples of the wave forms for first and second reference signals and a signal generated by an ultrasonic receiver.

In embodiments of the detector, modulation (chopping) frequency reference signals REF_1, REF_2 are fed into the first and second correlation filters 152, 154 respectively. The reference signals REF_1 and REF_2 may be of the same frequency (40 kHz) as the transmitter drive signal waveform. In this described embodiment, the second reference signal REF_2 has a phase which lags behind the first reference signal REF_1 by a quarter cycle of the driving frequency, which corresponds to $\pi/2$ radians or 90 decrees. FIG. 5 shows a graph with plots corresponding to examples of a receiver signal 142 produced by the ultrasonic receiver, the first reference signal REF_1, and the second reference signal REF_2.

Referring back to FIG. 4, in an embodiment of the detector, the driving waveform may be produced by a programmable or configurable drive circuit 160 which enables the amplitude of the driving signal to be adjusted in order to compensate for loop gain variations due to sensor pair sensitivity and possible aging. In addition the drive circuit may enable the (initial) phase of the drive signal to be adjusted with respect to the reference signals to compensate for the variations in sensor pair, mechanical mounting and gap width of the detector.

In an embodiment, the detector may be operative to determine a baseline or origin of detection for the ultrasonic sound signal when no sheet media is present in or near the gap 130 of the detector. When sheet media is present in the gap, the detector may be operative to determine the amount of phase delay in the ultrasonic sound signal caused by the sheet media. The amount of phase delay caused by the sheet media may be determined by a processor 170 of the detector responsive to the two outputs OUT_1 and OUT_2 produced by the first and second correlation filters 152, 154 respectively. The amount of phase delay may be used by the detector to determine if the sheet media passing through the gap corresponds to a single sheet or multiple sheets. Generally speaking, the more layers of media sheets in the sensing gap, the more phase delay it produces.

A phase delay which is caused by a single sheet may range between 0 and π rad. High numbers of multiple sheets may cause a phase delay that is greater than π rad. In an embodiment of the detector apparatus, the outputs of the correlation filters correspond to the differences in phase up to π radians between the receiver signal and the respective reference signals. Because the outputs of each correlation filter may correspond to phase angles which range from only 0 to π rad, high numbers of multiple sheets may produce phase angles differentials as measured by each correlation filter which correspond to the phase angle differentials of a single or low number of multiple sheets.

For example, a single (only one check or other sheet) may produce an average phase delay in the ultrasonic sound signal of about 0.5 π rad. A double (two overlapped checks or other sheets) may come close to producing a phase delay in the ultrasonic sound signal of π rad. A triple (three overlapped checks or other sheets) may produce a phase delay in the ultrasonic sound signal of around 1.5 π rad. However, because of the limited range of the phase angle differentials (0 to π) as measured by the correlation filters, a phase angle differential for the triple and a phase angle differential for a single may both be around 0.5 π rad. As will be discussed in more detail below, an embodiment of the detector is responsive to the outputs of both correlation filters to determine or reconstruct corresponding phase delay information for multiple sheets which may be greater than π rad.

Figure 6:
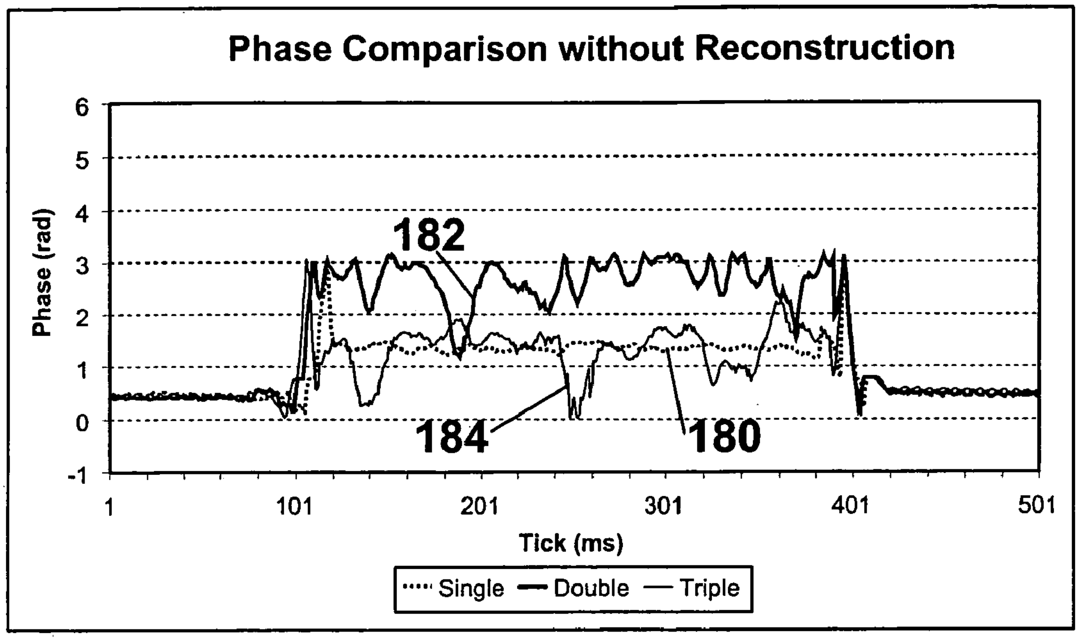
FIG. 6 is a graph showing examples of original phase angles produced by a detector for single, double and triple sheets passing through the detector.

FIG. 6 shows a graph of plots for the differential phase angles determined using the correlation filters for a single 180, double 182, and triple 184. Notice that the phase angles for the single 180 and the triple 184 substantially overlap, making it difficult to distinguish between the presence of a single or triple by the detector with phase angle differential information from the correlation filters.

Figure 7:
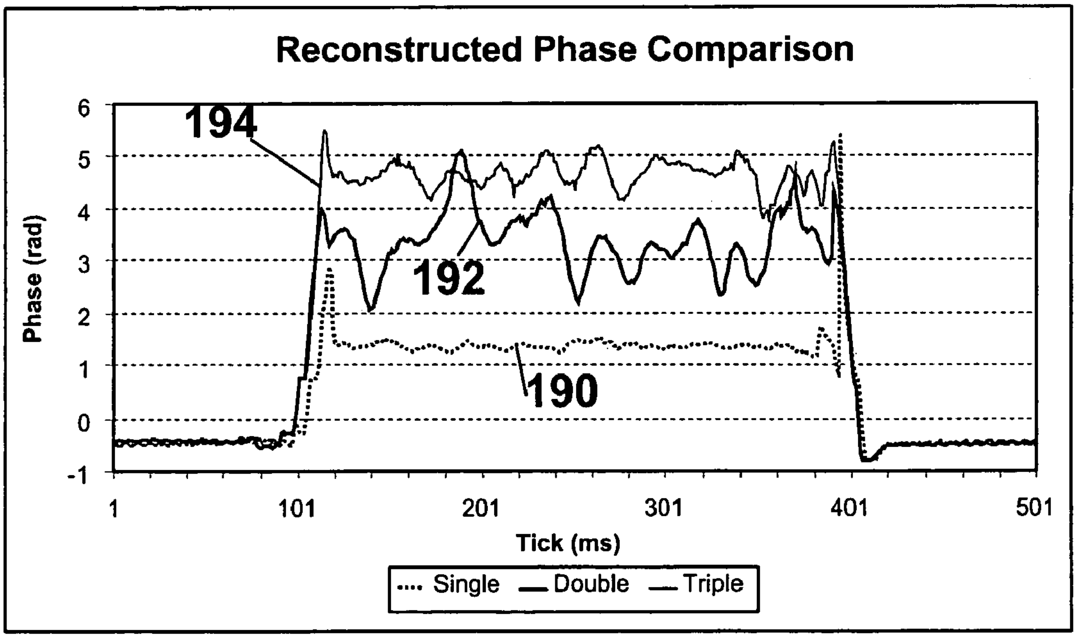
FIG. 7 is a graph showing examples of reconstructed phase angles produced by a detector for single, double and triple sheets passing through the detector.

FIG. 7 shows a graph of plots for the reconstructed phase delay determined by an embodiment of the detector for a single 190, double 192, and triple 194. Here the reconstructed phase delay for the triple 194 no longer overlaps with the reconstructed phase delay for a single 190. Consequently the detector may more accurately distinguish between single and multiple overlapped sheets responsive to the reconstructed phase delay determined by the detector.

Figure 8:
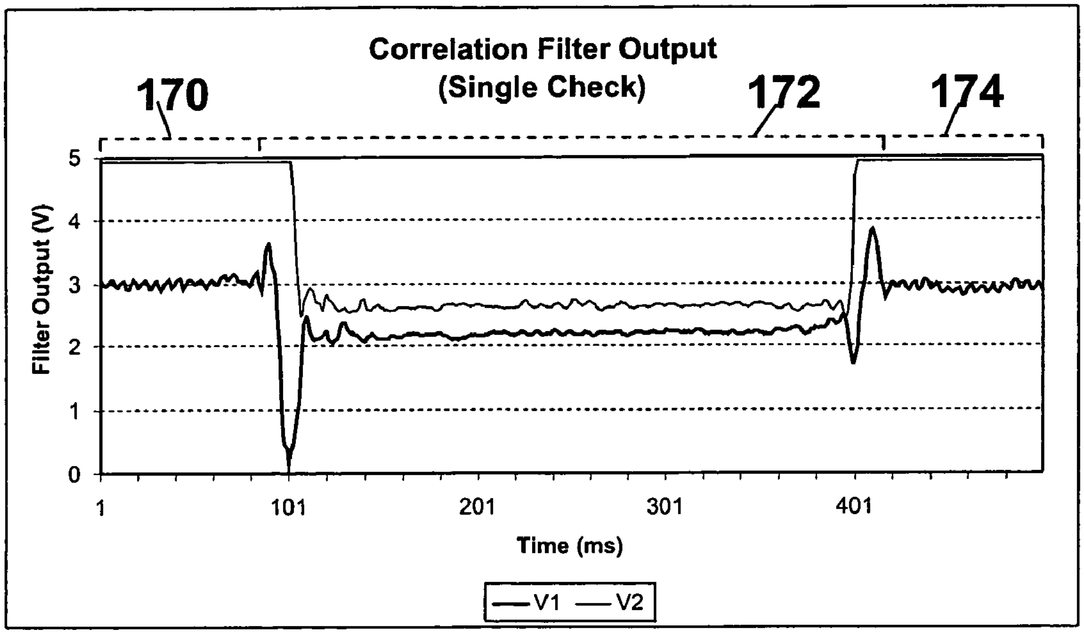
FIG. 8 is a graph showing examples of outputs from two correlation filters for a single sheet passing through the detector.

FIG. 8 shows a graph which includes plots for the outputs OUT_1, OUT_2 (in Volts) of the first and second correlation filters for an embodiment of the detector. The plots begin during a period of time 170 before a check reaches the gap between the transmitter and receiver and shows the period of time 172 while the check is being transported through the gap and the period of time 174 after the check has left the gap. In this described embodiment, the transport of the deposit accepting apparatus moves the check at about 500 mm/sec and the detector samples the outputs from the correlation filters at about a 1 kHz sampling rate.

As used herein, the condition of the detector when there is no sheet or other media present in or near the gap between the transmitter and receiver is referred to as the "no-sheet condition." As shown in FIG. 8, for the no-sheet condition (at times less then 87 ms or greater than 412 ms) the second correlation filter produces an output signal between about 4.92 and 4.93 volts which corresponds to about its saturation level. For the same time periods the first correlation filter produces an output signal between about 2.90 and 3.16 volts.

In this described embodiment, the saturated or maximum voltage values (e.g., 5 volts) produced by the correlation filters occurs when the phases of the receiver signal and the respective reference signal coincide. The voltage outputs from the correlation filters decrease to a minimum level (e.g., about zero) when the phases of the receiver signal and the respective reference signal are offset by about π rad. Thus, as the ultrasonic sound signal passes through one or more sheets in the gap of detector, the corresponding voltage values from the correlation filters change between maximum and minimum values (5 to 0 volts) in response to the phase of the receiver signal changing with respect to the phases of the reference signals.

For example, when the edge of the check reaches the gap (after about 95 ms), the phase of the ultrasonic sound signal begins to fluctuate and as a result the voltage outputs from the correlation filters fluctuate. As more of the interior body of the check moves into the gap (between about 120 and 380 ms), the phase of the ultrasonic sound signal becomes relatively more stable compared to the edges of the check, resulting in filter output voltages generally between 2.1-2.3 volts for the first correlation filter and generally between 2.5-2.7 volts for the second correlation filter.

In this described embodiment, after the check moves out of the detector and the gap is only filled with air (the no sheet condition), the phase delay of the ultrasonic sound signal decreases and the voltage outputs of the correlation filters return to the levels measured at the beginning of the plot prior to the check entering the gap.

To determine the reconstructed phase delay, the detector may be operative to adjust the output voltages responsive to predetermined offset values according to equations 1 and 2.

$$y_1 = v_1 - o_1 \quad \text{(EQ 1)}$$

$$y_2 = v_2 - o_2 \quad \text{(EQ 2)}$$

Here the adjusted voltages (y1 and y2) are calculated by subtracting the offset voltages (o1 and o2) from the original voltages (v1 and v2) produced by the first and second correlation filters respectively. Although the above equations show an example of subtraction, it is to be understood that as used herein subtraction may also correspond to adding one value to a negative of another value.

In embodiments of the detector, such offset values may be chosen so as to place the midpoint between the highest (saturated) output for each correlation filter and its respective lowest level output, at about a zero level. For example, if the output range of each correlation filter is between 0 and 5 volts, then an offset voltage of 2.5 volts may be chosen for each correlation filter. This offset voltage may be subtracted from each of the sampled outputs from the correlation filters to produce a set of bipolar adjusted output voltages.

Figure 9:
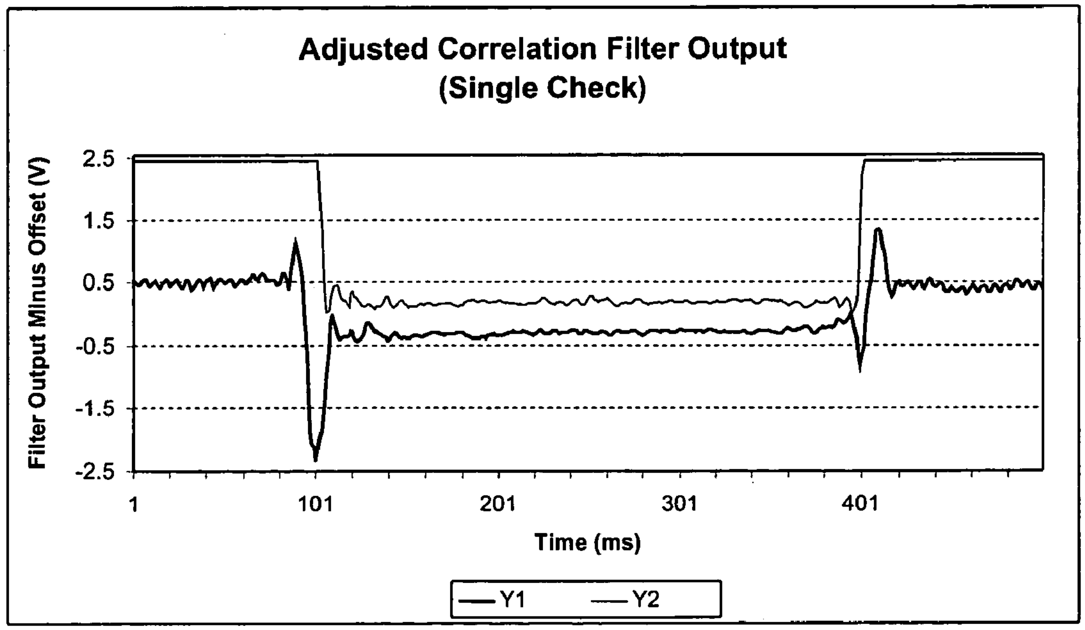
FIG. 9 is a graph showing examples of adjusted outputs from two correlation filters for a single sheet passing through the detector.

FIG. 9 shows plots for the adjusted output voltages which correspond to the plots of the original output voltages shown in FIG. 8 reduced by determined offset voltage values. Here the offset voltage for the first correlation filter was determined to be about 2.507 volts and the offset voltage for the second correlation filter was determined to be about 2.470 volts. As a result of the subtraction of these offset voltage values from the outputs of the corresponding correlation filters, the adjusted outputs may range between positive and negative values depending on the amount of phase angle differential between the receiver signal and the respective reference signal.

To further the determination of the reconstructed phase delay, embodiments of the detector may calculate virtual amplitude values responsive to the adjusted output voltage values. Such a calculation for a virtual amplitude may be performed according to equation 3.

$$A=\sqrt{y_1^2+y_2^2} \quad \text{(EQ 3)}$$

Figure 10:
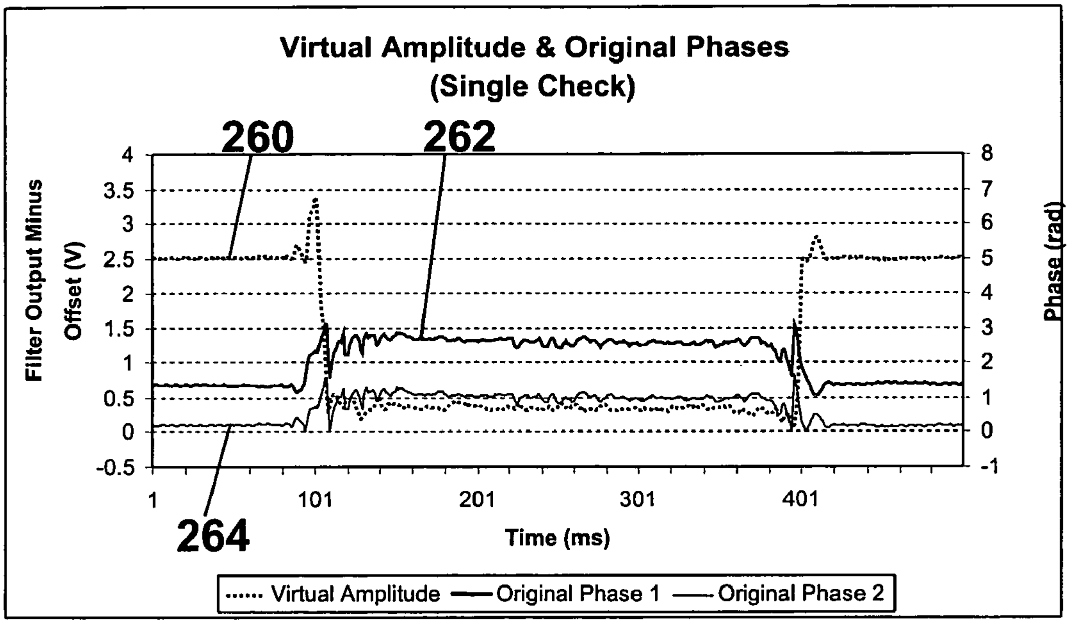
FIG. 10 is a graph showing examples of calculated original phases associated with each correlation filter and a calculated virtual amplitude for a single sheet passing through the detector.
Figure 11:
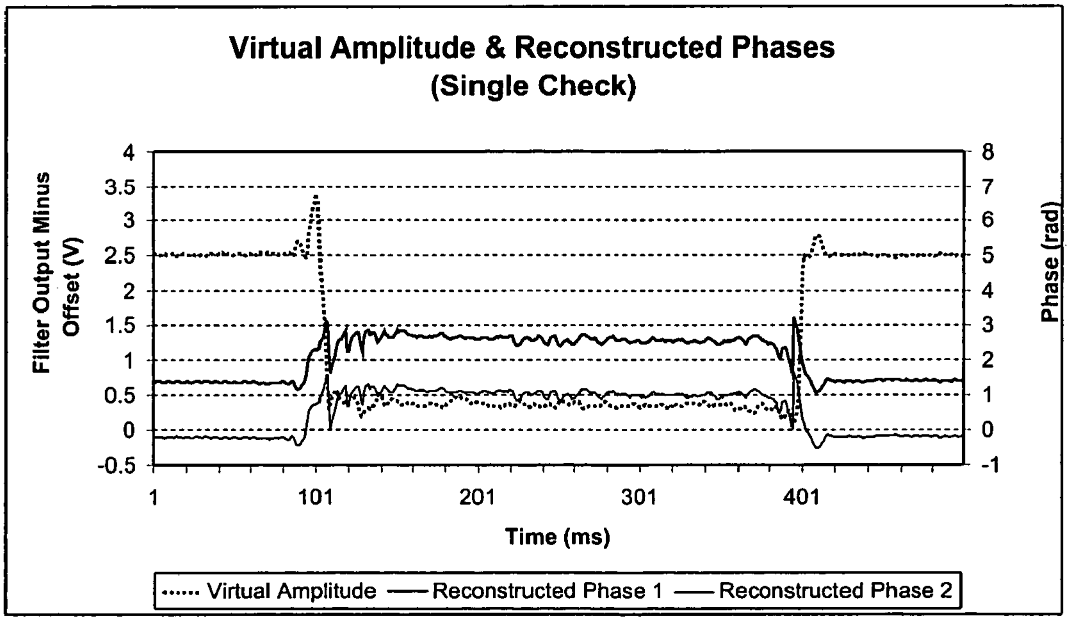
FIG. 11 is a graph showing examples of reconstructed phases associated with each correlation filter and the calculated virtual amplitude for a single sheet passing through the detector.

Here A corresponds to the virtual amplitude and $y_1$ and $y_2$ correspond to adjusted output voltages for the first and second correlation filters respectively. FIG. 10 shows a graph which includes a plot 260 of the calculated virtual amplitudes derived from the adjusted output voltages shown in FIG. 9.

As used herein, the phase angle differentials corresponding to the outputs of the correlation filters are referred to as original phase angles. Such original phase angles may be calculated for the adjusted outputs of at least one of the correlation filters responsive to equations 4 and/or 5.

$$\varphi_1 = \arccos\frac{y_1}{A} \quad \text{(EQ 4)}$$

$$\varphi_2 = \arccos\frac{y_2}{A} \quad \text{(EQ 5)}$$

Here $\phi_1$ and $\phi_2$ correspond to the original phases in radians which may be determined by calculating the arccos of the result of the division of the adjusted output voltages ($y_1$ and $y_2$) for the first and second correlation filters respectively by their corresponding virtual amplitude.

In addition to showing a plot of the virtual amplitude 260, FIG. 10 also shows the plots 262, 264 for the calculated original phase angles which correspond to the first and second adjusted output voltages shown in FIG. 9 for the first and second correlation filters respectively.

Figure 12:
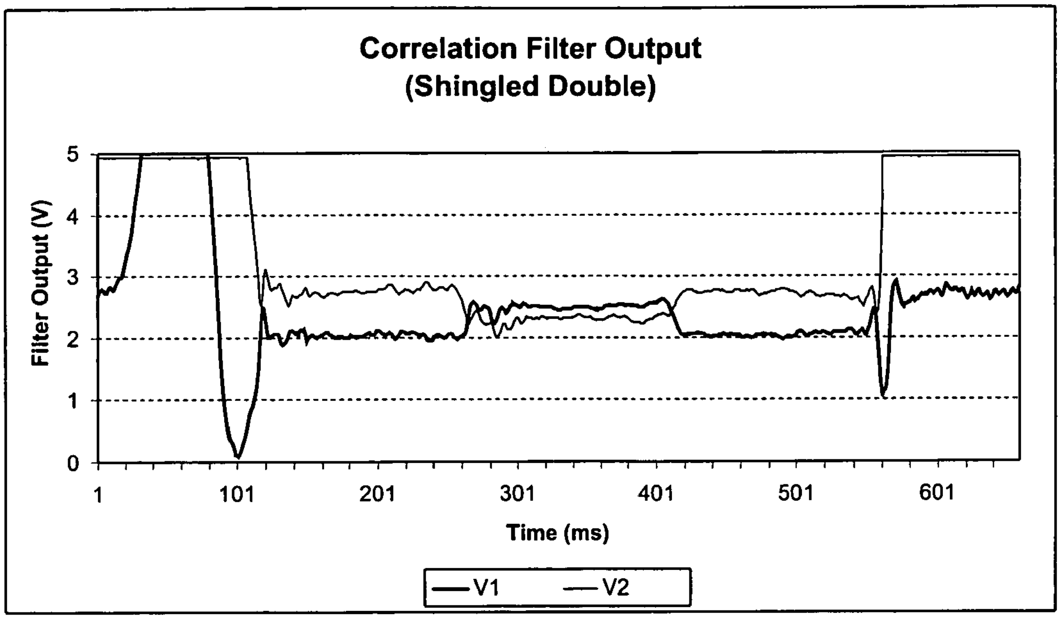
FIG. 12 is a graph showing examples of outputs from two correlation filters for a shingled double sheet passing through the detector.
Figure 13:
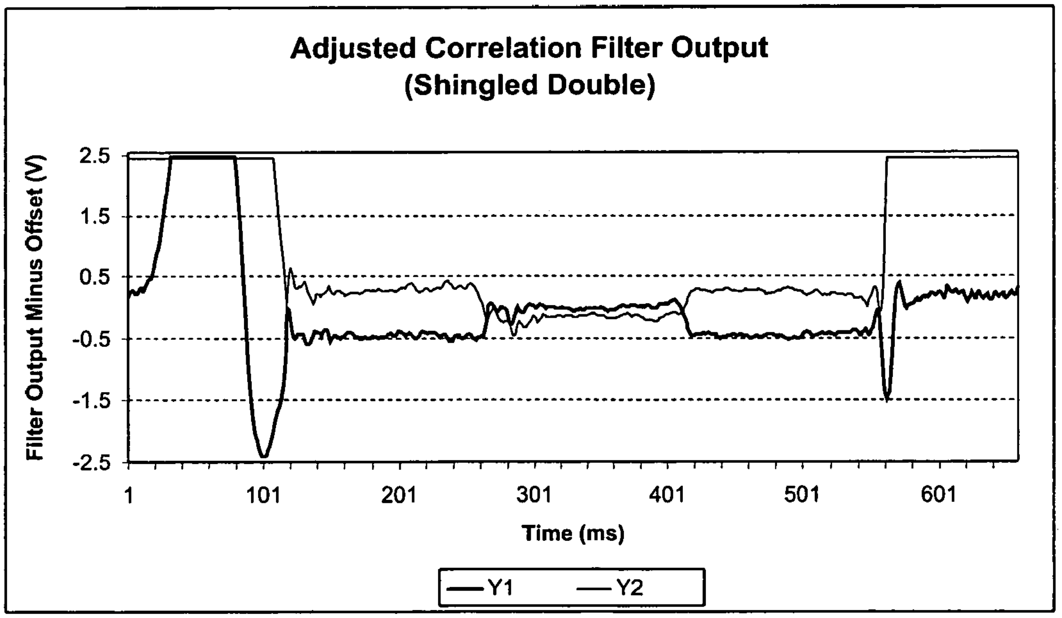
FIG. 13 is a graph showing examples of adjusted outputs from two correlation filters for a shingled double sheet passing through the detector.
Figure 14:
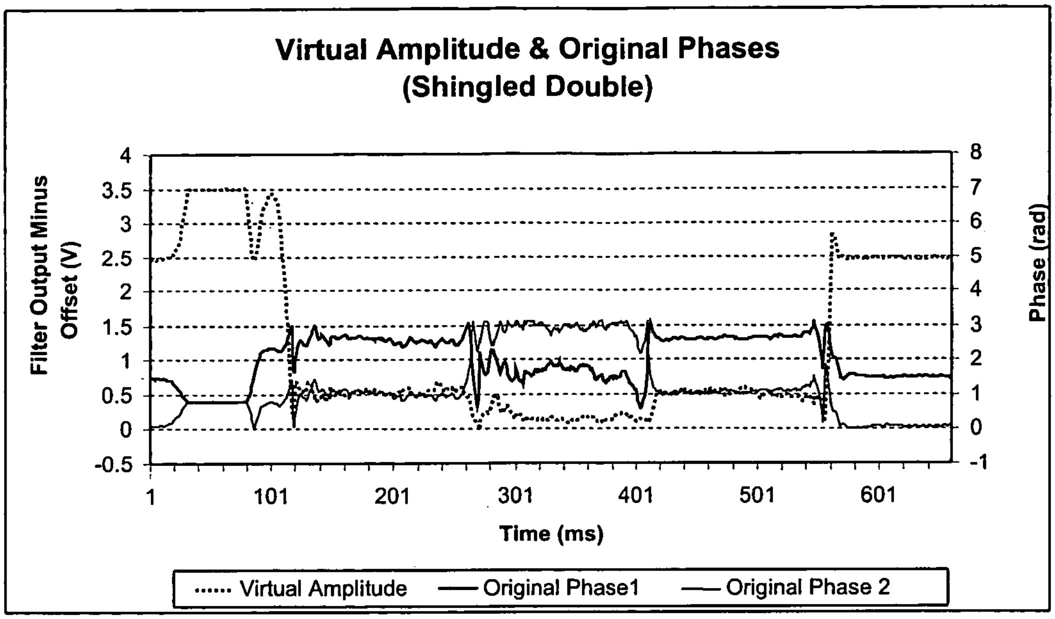
FIG. 14 is a graph showing examples of calculated original phases associated with each correlation filter and a calculated virtual amplitude for a shingled double sheet passing through the detector.
Figure 15:
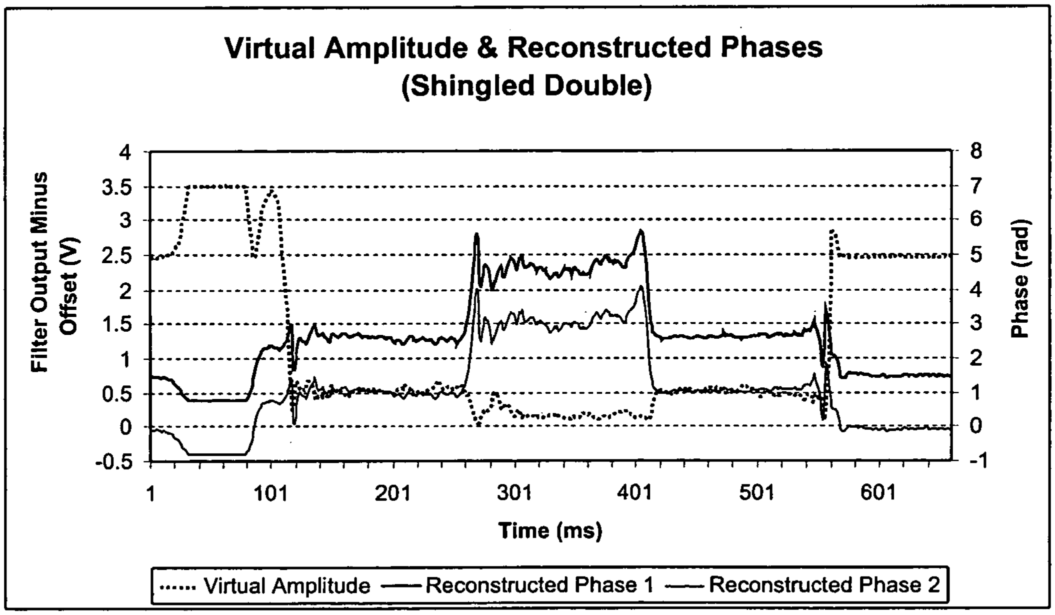
FIG. 15 is a graph showing examples of reconstructed phases associated with each correlation filter and the calculated virtual amplitude for a shingled double sheet passing through the detector.
Figure 16:
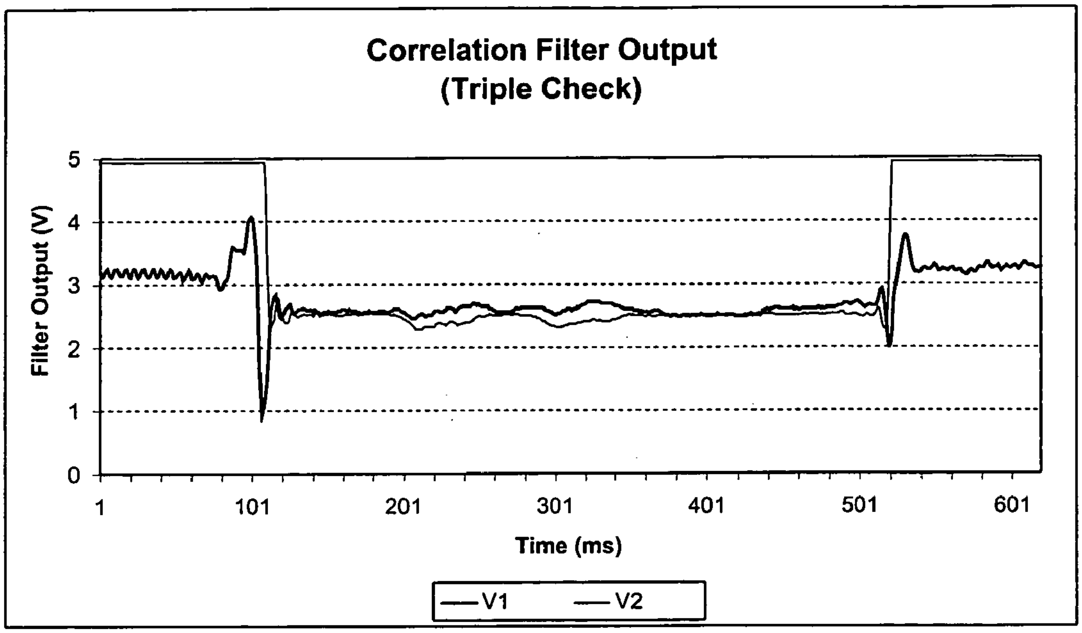
FIG. 16 is a graph showing examples of outputs from two correlation filters for three overlapped sheets passing through the detector.
Figure 17:
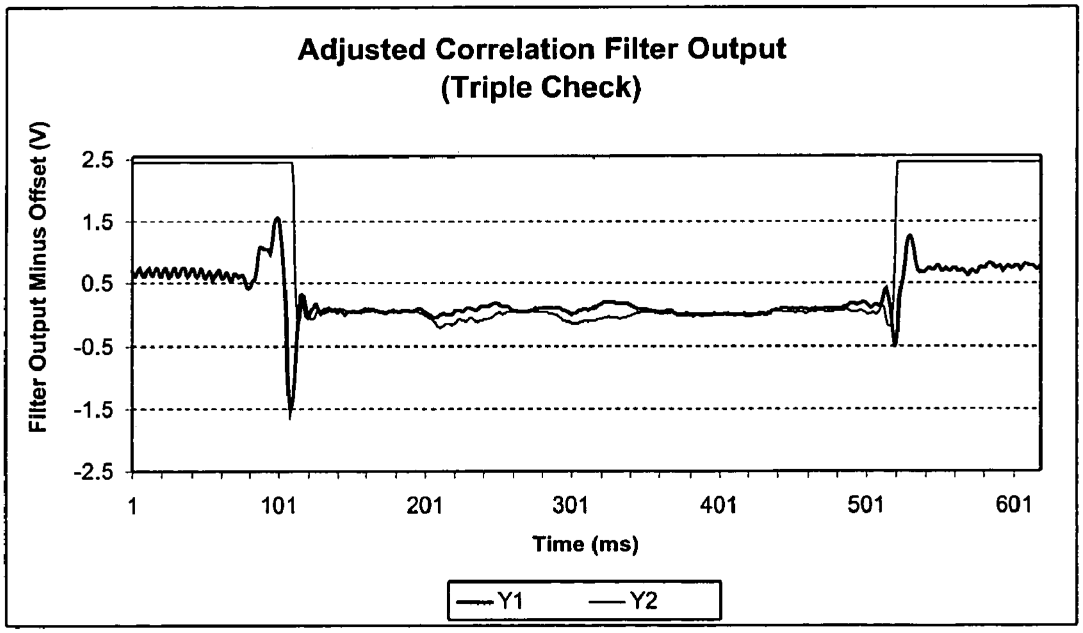
FIG. 17 is a graph showing examples of adjusted outputs from two correlation filters for three overlapped sheets passing through the detector.
Figure 18:
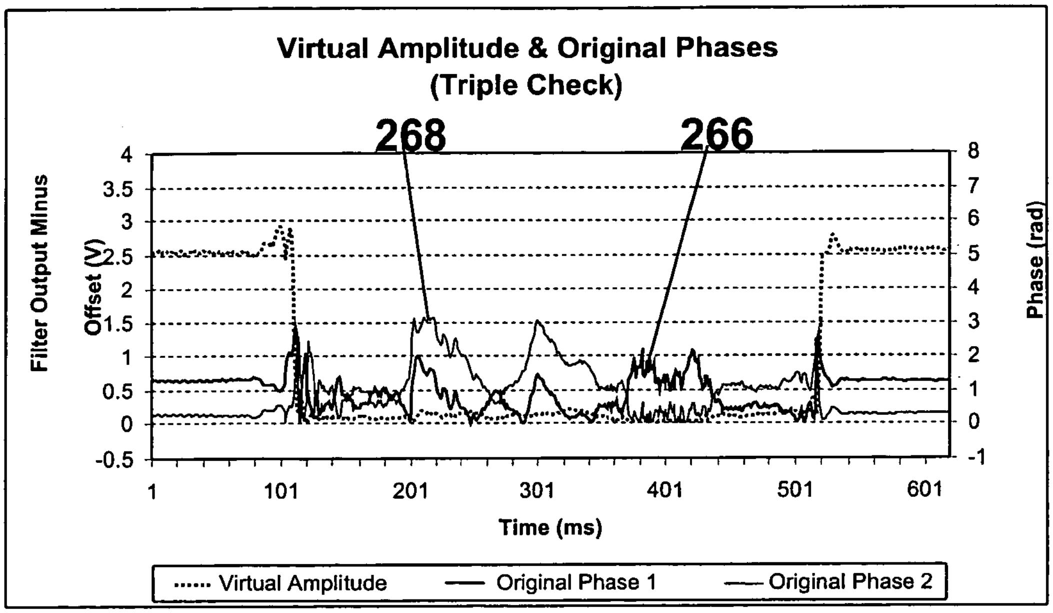
FIG. 18 is a graph showing examples of calculated original phases associated with each correlation filter and a calculated virtual amplitude for three overlapped sheets passing through the detector.
Figure 19:
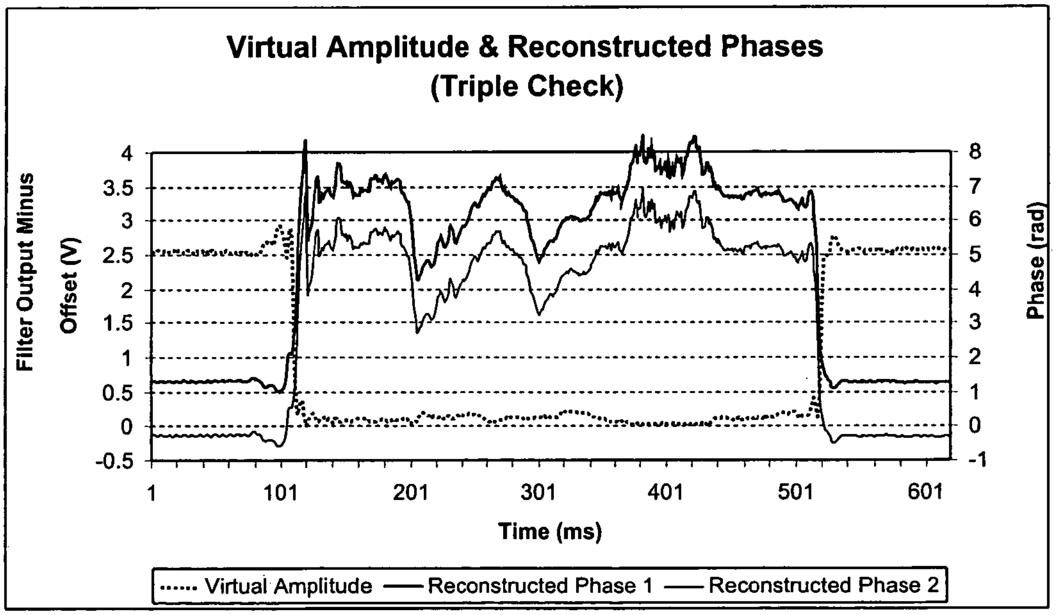
FIG. 19 is a graph showing examples of reconstructed phases associated with each correlation filter and the calculated virtual amplitude for three overlapped sheets passing through the detector.

For the described embodiment, FIGS. 8-10 show plots associated with a single sheet passing through the detector. FIGS. 12-14 show corresponding plots for the case in which the sheet passing through the detector is partially folded over to form a two-layer overlapped portion (referred to herein as a shingled double). FIGS. 16-18 show corresponding plots for the case in which three overlapping sheets (referred to herein as a triple) passes through the detector.

As discussed previously, the original phase angles calculated from the outputs of the correlation filters range between 0 and π rad. Thus, even though the actual phase delay of the ultrasonic sound signal may be greater than π radians for the case of a triple, the original first and second phase angles 266, 268 calculated from the first and second correlation filters and shown in FIG. 18 for a triple are less then π rad. As a result the original phase angles calculated for a triple (FIG. 18) are relatively similar to the original phase angles calculated for a single (FIG. 10), making it difficult to distinguish between a triple and a single based only on the calculated original phase angles.

Thus to uncover phase delay information that is greater than π radians from original phase angles that do not exceed π rad, the embodiment of the detector is operative to map the original phase angles to reconstructed phase angles, which may include angles greater than π rad.

In this described embodiment, the reconstructed phase angles may be determined by evaluating the incremental changes in the signs of the adjusted outputs as a sheet passes through the gap between the transmitter and receiver. Such an evaluation may be performed in view of the fact that the reconstructed phase angles for the second correlation filter must lag behind the reconstructed phase angles for the first correlation filter by π/2. This relationship between original phases for the two correlation filters occurs as a result of the detector producing the second reference signal REF_2 with a phase that lags behind the phase of the first reference signal REF_1 by π/2.

FIG. 20 shows a table 300 which includes the corresponding correlation filter outputs 310, 312 (in volts), adjusted outputs 314, 316, virtual amplitude 308, and calculated original phase angles 302, 306 (in radians) represented in the plots for FIGS. 8-10 for an output sample from the correlation filters at 2 ms. This sample is during the no-sheet condition of the detector. Similar measurements and calculated values are also produced by the detector in the no-sheet conditions shown in plots for FIGS. 12-14 and 16-18.

As shown in FIG. 20, the original phase angles 302, 306 for the first and second correlation filters are 1.370 radians and 0.201 radians respectively. In this described embodiment the detector is operative to determine that the corresponding reconstructed phase values 304, 308 are 1.370 radians and −0.201 radians respectively. Formulas for mapping the original phase angles to corresponding reconstructed phase angles may vary depending on the reconstructed phase angle determined for the preceding sample and depending on the changes in signs of the adjusted outputs from the previous sample to the current sample.

Figure 21:
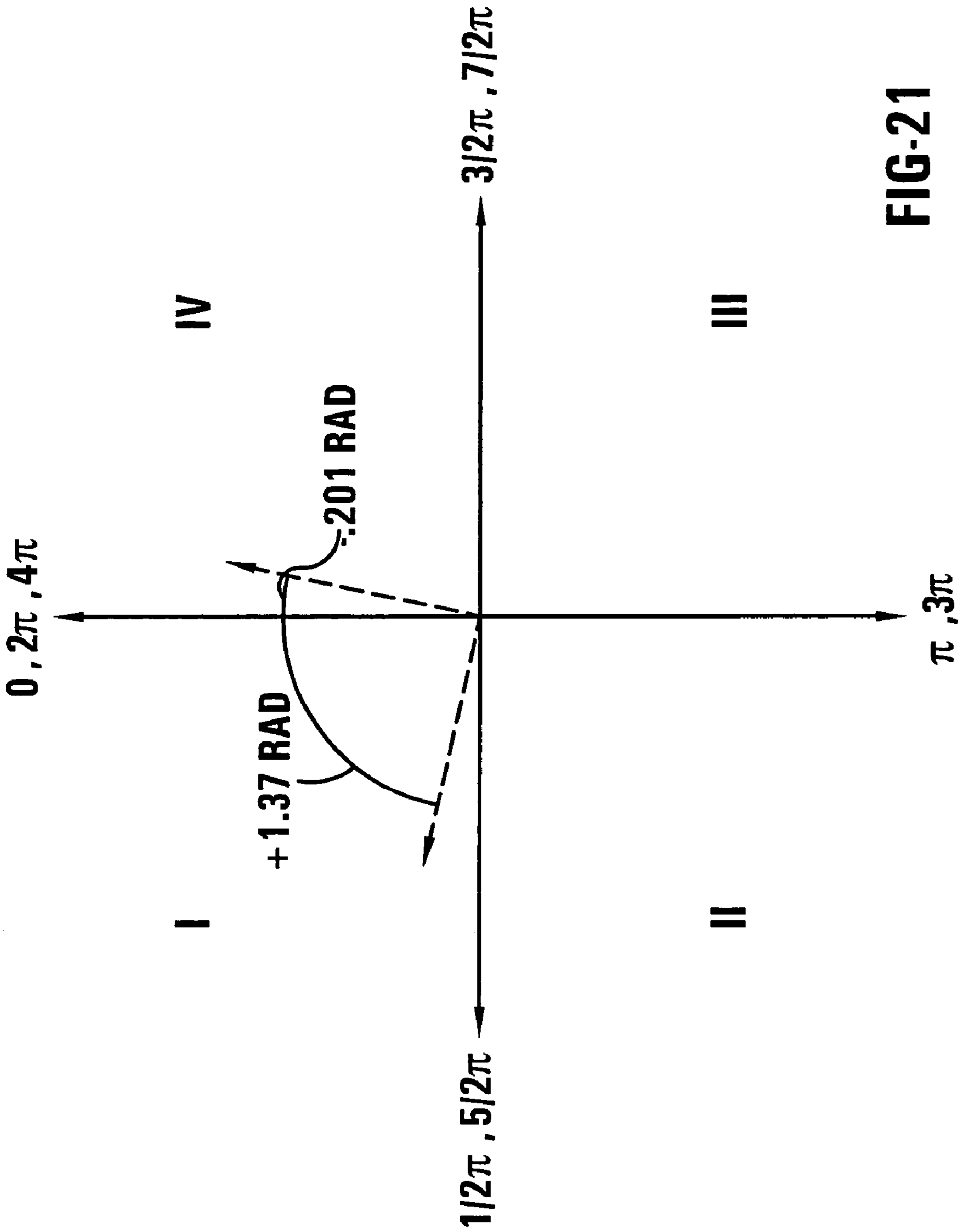
FIG. 21 is an example of a four-quadrant graph showing the positions of the reconstructed phase angles for the single sample.

As shown in FIG. 21, a graph which plots phase angles may be divided into four ninety degree (π/2 radians) quadrants (I, II, III and IV) which increase in a counter-clockwise sequence. The first quadrant (I) ranges between 0 and π/2 radians. The second quadrant (II) ranges from π/2 radians to π radians. The third quadrant (III) ranges from π radians to 3π/2 radians. The fourth quadrant (IV) ranges from 3π/2 radians to 2π radians.

If the reconstructed phase for the first correlation filter were plotted on such a four-quadrant graph, the reconstructed phase angle 304 of 1.370 radians for the first correlation filter would fall in the first quadrant (I) as shown in FIG. 21. In addition, the reconstructed phase angle 308 of −0.201 radians for the second correlation filter would fall in the fourth quadrant (IV) and lags reconstructed phase angle of the first correlation filter by about π/2 radians.

In this described embodiment, while the detector remains in the no-sheet condition, the correlation filters will continue to generate voltage values corresponding to the voltage values 310, 312 shown in FIG. 20. However, when the edge of the sheet reaches the detector (around 95 ms) the ultrasonic phase delay begins to fluctuate and the corresponding output voltages fluctuate. The described embodiment of the detector is operative to sample the outputs of the correlation filters at a sufficiently high rate (1 kHz) to track the change in the adjusted outputs and/or corresponding original phase angles with sufficient resolution to detect the gradual movement in reconstructed phase angle from one quadrant to an adjacent quadrant. As a result, the reconstructed phases corresponding to each sample will fall in either the same quadrant as the preceding sample or will fall in one of the adjacent quadrants as the phase of the ultrasonic sound signal fluctuates in response to sheet media in the detector. For example, as shown in FIG. 21, if the preceding sample has a reconstructed phase angle found in the first quadrant (I), the reconstructed phase angle of the next sample from the same correlation filter will either remain in the first quadrant (I) or increase to fall in the second quadrant (II) or decrease to fall in the fourth quadrant (IV).

In this described embodiment, the sample rate is sufficiently high to minimize the opportunity for the reconstructed phase angles to change to a non-adjacent quadrant compared to the preceding reconstructed phase angle. Thus, if the preceding sample has a reconstructed phase angle found in the first quadrant (I), the reconstructed phase angle of the next sample for the same correlation filter should not fall in the third quadrant (III).

As shown in FIG. 21, as the phase delay of an ultrasonic sound signal increases with media in the detector from 0 to 2π rad, a plot of the changing reconstructed phase will theoretically move from the first quadrant (I) to the second quadrant (II), then from the second quadrant (II) to the third quadrant (III), then from the third quadrant (III) to the fourth quadrant (IV). After the fourth quadrant (IV) the reconstructed phase will once again follow through the four quadrants (I through IV) as the phase delay of the ultrasonic sound signal increases from 2π to 4π.

The table shown in FIG. 22 lists quadrants 484 in which the reconstructed phase angles (for the first correlation filter) may move through with the insertion of one or more sheets in the detector. A first set 402 of quadrants (I to IV) is listed without a superscript and correspond to the first cycle around the graph the reconstructed phase angles for the first correlation filter may move through.

When the reconstructed phase angle increases and moves through the four quadrants (I to IV) a second or third time/cycle the second or third sets of quadrants 404, 406 are listed with a +1 or +2 superscript respectively in the table. Correspondingly if the reconstructed phase were to move in the opposite direction from the initial first quadrant I to the fourth quadrant IV, the table lists the set 408 of the preceding set of quadrants with a −1 superscript.

In embodiments of the detector, the phase of the drive signal relative the phases of the reference signals may be set/adjusted by the hardware of the detector to place the minimum reconstructed phase delay for the first correlation filter in the first quadrant (I) for the no-sheet condition. However, because the second reference signal lags the first reference signal by π/2, in the no-sheet condition, the reconstructed phase angle for the second correlation filter will fall in the fourth quadrant with an associated negative superscript ($IV^{-1}$)

FIG. 23 shows a table of values associated with the detection of a triple. These values are represented in graphs 16-20 and correspond to the time period between 102-128 ms. This time period represents a period that starts before a triple overlapped sheet reaches the detector and ends while a portion of the triple is within the gap of the detector.

An initial set 502 of the samples corresponds to the time period during the no-sheet condition of the detector. In this initial set of samples, the signs 414, 416 of the first and second adjusted outputs 418, 419 respectively are positive (+,+). The process of reconstructing phase angles begins with the predetermined knowledge (as set by the hardware) that when in the no-sheet condition, the positive pair of signs (+,+) of the adjusted outputs corresponds to reconstructed phase angles for the first correlation filter falling in the first quadrant (I). FIG. 22 reflects this association in row 403 which associates the first quadrant (I) with a pair of positive signs (+,+). In addition, FIG. 22 also associates with each quadrant corresponding equations 420 usable to map original phase angles to reconstructed phase angles.

For example, the row 403 associated with the first quadrant (I) and the sign pair (+,+) in FIG. 22 indicates the following equations 6 and 7 are usable by the detector to map the original phase angles to reconstructed phase angles for the first and second correlation filters respectively.

$$\Phi_1=\phi_1 \quad \text{(EQ 6)}$$

$$\Phi_2=-\phi_2 \quad \text{(EQ 7)}$$

Here the variables $\phi_1$ and $-\phi_2$ represent the original phase angles for the first and second correlation filters respectively for a sample and the variables $\Phi_1$ and $\Phi_2$ represent the reconstructed phase angles for the first and second correlation filters respectively.

Referring back to FIG. 23, for the sample at 105 ms, the original phase angles 420, 424 for the first and second correlation filters are 1.53 radians and 0.048 radians respectively. Responsive to equation 6 and 7, these original phase angles may be mapped to the reconstructed phase angles of 1.53 radians and −0.048 radians respectively.

As discussed previously, the signs 422, 426 associated with the adjusted outputs 420, 424 for the 105 ms sample are both positive (+,+). However, the following sample at 106 ms, has an adjusted output 430 associated with the first correlation filter which now has a negative sign 432 while the adjusted output 434 associated with the second correlation filter continues to have a positive sign 436. The corresponding pair of signs for the 106 ms sample is thus negative and positive (−, +).

This change of sign of one of the adjusted outputs from the 105 ms sample to the 106 ms sample indicates that the reconstructed phase for the first correlation filter (and the second) has moved to a new quadrant (likely as a result of the edge of the triple coming close to the gap or moving into the gap of the detector).

To determine which quadrant, the detector may be operative to analyze the current sample and the preceding sample using a firmware or software program which is configured to be responsive to portions of the information represented in FIG. 22. For example, the detector may include a program that is operative to determine that the preceding sample (at 105 ms) has a reconstructed phase angle for the first correlation filter that was in the first quadrant (I). Such a program may also determine that of the adjacent quadrants ($IV^{-1}$ or II) to the first quadrant (I), the signs (−, +) of the current sample (106 ms) correspond to the signs (−, +) associated with the second quadrant (II) and not the signs (+, −) associated with the fourth quadrant $IV^{-1}$.

Based on the determination that the current sample (106 ms) should have a reconstructed phase angle for the first correlation filter that is now in the second quadrant (II), the following equations 8 and 9 may be used to map the original phase angles 410, 412 to corresponding reconstructed phase angles 411, 413:

$$\Phi_1=\phi_1 \quad \text{(EQ 8)}$$

$$\Phi_2=\phi_2 \quad \text{(EQ 9)}$$

Responsive to these equations, the original phase angles of 1.920 radians and 0.349 radians for the sample at 106 ms (FIG. 23) may be mapped to the reconstructed phase angles of 1.920 radians and 0.349 radians respectively.

As shown in FIG. 23, the samples from 106 ms to 112 ms have associated sets of signs 414, 416 for the first and second adjusted outputs which continue to correspond to negative and positive values (−, +) respectively. However, the following sample at 113 ms, has an adjusted output 454 associated with the second correlation filter which now has a negative sign 436 while the adjusted output 452 associated with the first correlation filter continues to have a negative sign 436. The corresponding pair of signs for the 113 ms sample is thus negative and negative (−, −).

This change in signs from the 112 ms sample to the 113 ms sample indicates that the reconstructed phase for the first correlation filter (and the second) has again moved to a new quadrant. To determine which quadrant, the detector may be operative to again analyze the current sample and the preceding sample responsive to portions of the information represented in FIG. 22.

For example, the program associated with the detector may be operative to determine that the preceding sample (112 ms) has a reconstructed phase angle for the first correlation filter that was in the second quadrant (II). Such a program may also determine that of the adjacent quadrants (I or III) to the second quadrant (II), the signs (−,−) of the current sample (113 ms) correspond to the signs (−,−) associated with the third quadrant (III) and not the signs (+,+) associated with the first quadrant (I).

Based on the determination that the current sample (113 ms) should have a reconstructed phase angle for the first correlation filter that is in the third quadrant (III), the following equations 10 and 11 may be used to map the original phase angles to the reconstructed phase angles:

$$\Phi_1=2\pi-\phi_1 \quad \text{(EQ 10)}$$

$$\Phi_2=\phi_2 \quad \text{(EQ 11)}$$

Responsive to these equations, the original phase angles of 2.679 radians and 2.034 radians for the sample at 113 ms (FIG. 23) may be mapped to the reconstructed phase angles of 3.605 radians and 20.34 radians respectively.

Continuing down the table in FIG. 23, the following sample at 114 ms has an adjusted output 460 associated with the first correlation filter which now has a positive sign 462 while the adjusted output 464 associated with the second correlation filter continues to have a negative sign 466. The corresponding pair of signs for the 114 ms sample is thus positive and negative (+, −).

This change in sign from the 113 ms sample to the 114 ms sample indicates that the reconstructed phase angle for the first correlation filter (and the second) has again moved to a new quadrant. To determine which quadrant, the detector may be operative to analyze the current sample and the preceding sample responsive to portions of the information represented in FIG. 22.

For example, the program associated with the detector may be operative to determine that the preceding sample (113 ms) had a reconstructed phase angle for the first correlation filter that was in the third quadrant (III). The program may also determine that of the adjacent quadrants (II or IV) to the third quadrant (III), the signs (+,−) of the current sample (114 ms) correspond to the signs (+,−) associated with the fourth quadrant (IV) and not the signs (−,+) associated with second quadrant II.

Based on the determination that the current sample (114 ms) should have a reconstructed phase angle for the first correlation filter that is in the fourth quadrant (IV), the following equations 12 and 13 may be used to map the original phase angles to the reconstructed phase angles:

$$\Phi_1=2\pi-\phi_1 \quad \text{(EQ 12)}$$

$$\Phi_2=2\pi-\phi_2 \quad \text{(EQ 13)}$$

Responsive to these equations, the original phase angles of 0.997 radians and 2.568 radians for the sample at 114 ms (FIG. 23) may be mapped to the reconstructed phase angles of 5.286 radians and 3.715 radians respectively.

Continuing down the table in FIG. 23, the next sample (115 ms) has signs (+,−) associated with the adjusted outputs which correspond to the reconstructed phase angle for the first correlation filter remaining in quadrant IV. However, the next sample at 116 ms has an adjusted output 474 associated with the second correlation filter which now has a positive sign 476 while the adjusted output 470 associated with the first correlation filter continues to have a positive sign 472. The corresponding pair of signs for the 116 ms sample is thus positive and positive (+,+).

This change in sign from the 115 ms sample to the 116 ms sample indicates that the reconstructed phase angle for the first correlation filter (and the second) has again moved to a new quadrant. To determine which quadrant, the detector may be operative to analyze the current sample and the preceding sample responsive to portions of the information represented in FIG. 22.

For example, the program associated with the detector may be operative to determine that the preceding sample (115 ms) had a reconstructed phase angle for the first correlation filter that was in the fourth quadrant (IV). The program may also determine that of the adjacent quadrants (III or I) to the fourth quadrant (IV), the signs (+,+) of the current sample (116 ms) correspond to the signs (+,+) associated with phase angles and corresponding reconstructed the first quadrant of the next cycle ($I^{+1}$) and not the signs (+,−) associated with third quadrant (III).

Based on the determination that the current sample (116 ms) should have a reconstructed phase angle for the first correlation filter that is in the first quadrant of the next cycle ($I^{+1}$), the following equations 14 and 15 may be used to map the original phase angles to the reconstructed phase angles:

$$\Phi_1=2\pi+\phi_1 \quad \text{(EQ 14)}$$

$$\Phi_2=2\pi-\phi_2 \quad \text{(EQ 15)}$$

Responsive to these equations, the original phase angles of 0.508 radians and 1.062 radians for the sample at 116 ms (FIG. 23) may be mapped to the reconstructed phase angles of 6.792 radians and 5.221 radians respectively.

For cases where the reconstructed phase angles continue to increase through quadrants $I^{+1}$, $II^{+1}$, $III^{+1}$, $IV^{+1}$, and $I^{+2}$, the reconstructed phases may be calculated from the original phase angles responsive to the corresponding formulas 420 listed in the table.

As the preceding examples illustrate, in an embodiment of the detector, the sign pairs of the adjusted outputs for a sample and the sign pairs of the preceding sample from the correlation filters may be used by the detector to determine how to map the calculated original phase angles to reconstructed phase angles which more accurately reflect the phase delay of the ultrasonic sound signal.

The change in sign pairs reflects changes or movement of the original and/or reconstructed phase angles for consecutive samples from one quadrant to another adjacent quadrant. As used herein a quadrant corresponds to a span or range of $\pi/2$ (ninety degree) angles. In alternative embodiments of the detector, other methods for detecting for changes in the outputs reflecting phases moving from one quadrant (span of $\pi/2$ angles) to another adjacent quadrant (span of $\pi/2$ angles) may be used. For example rather than monitoring the change in sign pairs of the adjusted outputs as discussed previously, the detector may monitor the non-adjusted outputs of the correlation filters for values which pass predetermined voltage thresholds. Such thresholds may correspond to the offset values discussed previously. For example, if the offset voltages for each correlation filter correspond to 2.5 volts, the detector may be operative to monitor for changes in the outputs which move from above to below 2.5 volts or move from below to above 2.5 volts. Thus an alternative embodiment may be operative to determine how to map an original phase angle to a reconstructed phase angle responsive to which direction the threshold is being crossed, which correlation filter output is crossing the threshold, and the previous sample's associated quadrant.

As discussed previously, the reconstructed phase angles for each correlation filter are separated by $\pi/2$ rads. As a result, original phase angles and reconstructed phase angles associated with only one of the correlation filters may be needed to determine if sheet media corresponds to a single sheet or multiple sheets. Thus, in order to reduce the number of calculations performed by a processor, the detector may be operative to only determine original phase angles and corresponding reconstructed phase angles for only one of the correlation filters rather than for both correlation filters. However as discussed previously the determination of original phase angles and the mapping of the original phase angles to the reconstructed phase angles is done responsive to the outputs from both correlation filters.

Embodiments of the detector may be operative to use fixed threshold values to distinguish reconstructed phase angles corresponding to single sheets and reconstructed phase angles corresponding to multiple sheets. For example, as shown in FIG. 7, a single sheet passing through the detector may consistently produce reconstructed phase angles which are less than 3 rads, whereas doubles, or triples or other multiples of sheets may produce reconstructed phase angles which consistently extend above 3 radians. Thus a fixed threshold corresponding to 3 rads may be used by the detector for determining when media in the detector corresponds to multiple overlapped sheets.

In other embodiments, other algorithms may be used which distinguish single sheets from multiple sheets based on the reconstructed phase angles produced. For example, in alternative embodiments, average or median reconstructed phase angles may be compared to one or more threshold values rather than the maximum angle produced by the detector to distinguish between single or multiple sheets.

In addition, alternative embodiments of the detector may be operative to determine the number of sheets when multiple sheets are detected. For example responsive to the reconstructed phase angles produced, the detector may be used to distinguish between doubles or triples or other multiples of sheets.

In embodiments of the detector, the described reconstruction algorithm may produce reconstructed phase angles which consistently correspond to the actual phase delay of the ultrasonic sound signal when flat sheets(s) are used, be it a single or multiple (either perfect multiple or shingled multiple). However, a crumpled single may produce corresponding reconstructed phase angles which appear to the detector as indicating the presence of a double or triple. The extra ringing on the leading edge of the crumpled check waveform may be one cause for an abnormally large reconstructed phase angle.

In embodiments of the detector, the extra ring typically appears within 8 ms after the leading edge reaches the detector or before the adjusted output for the second correlation filter ($y_2$) goes from positive to negative. The waveform ringing eventually settles down. Thus an alternative embodiment may be operative to wait a predetermined amount of time after the adjusted output for the second correlation filter ($y_2$) goes from positive to negative for the first time (the reconstructed phase angle associated with the first correlation filter should be moving from the second quadrant (II) to the third quadrant (III) at that point). After the predetermined amount of time has elapsed, the detector may continue with the determination of the reconstructed phase angles under the assumption that the first sample being reconstructed after the delay is within one quadrant from the third quadrant (III).

In an embodiment of the detector, the predetermined amount of time may correspond to a delay of about 56 ms which may also correspond to about 26 mm of movement of the sheet at a 500 mm/sec transport speed. The reconstructed phase angles continue to be determined as described above for the samples during the predetermined amount of time (also referred to herein as a time delay). However for the first sample after the time delay, the detector may reset the associated quadrant and/or signs of the sample to an updated quadrant number and/or set of signs.

In this described embodiment, the quadrant (for the first correlation filter) that is associated with this first sample after the time delay may be determined to remain in either of the second (II), third (III) or fourth (IV) quadrants, if the corresponding reconstructed phase angle (for the first correlation filter) that is associated with this first sample after the time delay is in the second (II), third (III) or fourth (IV) quadrants after the delay. However, the detector may be operative to reset the sample to correspond to the second quadrant (II) (and/or the signs associated with the second quadrant) if the reconstructed phase angle for this first sample after the time delay corresponds to a quadrant less than the second quadrant (II). In addition the detector may be operative to reset this first sample after the time delay to correspond to the fourth quadrant (IV) (and/or the signs associated with the fourth quadrant) if the reconstructed phase angle for the sample corresponds to a quadrant greater than the fourth quadrant (IV).

After the quadrant (and/or signs for the quadrant) associated with this first sample after the time delay has or has not been reset as discussed above, the detector is operative to continue with determining reconstructed phase angles for the second sample after the delay. However, when determining with which quadrant the second sample after the delay is associated, the comparison of the signs between the first sample after the delay and the second sample after the delay is performed relative to the quadrant and/or signs to which the first sample may have been reset.

Thus if the quadrant associated with the first sample after the delay was reset from the first quadrant in the next cycle ($I^{+1}$) down to the fourth quadrant (IV), the evaluation as to what quadrant the second sample after the delay is associated with is determined relative the first sample after the delay being in the fourth quadrant (IV) with signs of (+,−) rather than being in the first quadrant in the next cycle ($I^{+1}$) with signs of (+,+). After the second sample after the delay the detector determines the reconstructed phases of subsequent samples in the manner previously described without resetting the associated quadrants of the preceding samples.

In an embodiment the detector may include a processor operative to perform one or more of the calculations discussed previously involving equations 1-15. In an alternative embodiment, a processor such as a computer of the apparatus (e.g. an automated banking machine or other machine) which comprises the detector may perform one or more of the calculations discussed previously. Such embodiments may include software with math libraries capable of performing square root, arccos functions and other relatively complex floating point operations.

However, in an alternative embodiment, rather than performing complex math functions such as the arccos function for each sample measured by the detector, the processor which determines the original phase angle values may access a data store included in the detector or elsewhere which includes stored therein a table of pre-calculated phase angles. The processor may be operative to use the table to lookup at least one of the original phase angles for each sample using the adjusted outputs for the correlation filters as an index to the table.

In this described embodiment, the processor may be able to lookup data corresponding to original phase angles from a table substantially faster than performing the arccos function and the other complex floating point calculations discussed above with respect to equations 4 and 5.

In an embodiment of the detector, the analog voltage outputs ($v_1$ and $v_2$) from the correlation filters may be processed by A/D converters to produce corresponding 8-bit digital outputs. For example, analog outputs ranging from 0 to 5 volts may be converted to digital outputs ranging from 0-255. For example, the processor may produce corresponding 8-bit digital adjusted output values ($y_1$ and $y_2$) according to equations 1 and 2 above to produce bipolar digital adjusted outputs ranging from −128 to +128.

The processor may combine the adjusted outputs from the two correlation filters to form an index usable to retrieve a corresponding original phase angle(s) from the pre-calculated table. In an embodiment of the detector, the table may have a length of 64 k to represent all combinations of adjusted outputs ($y_1$ and $y_2$) from the correlation filters (e.g., 256 times 256). Each row may include two precalculated 16-bit values, which values correspond to the precalculated original phase angles ($\phi_1$ and $\phi_2$) for the first and second correlation filters respectively. As a result such a table may have a size of about 256 k bytes (64 k times 32 bits).

In an alternative embodiment, the table size (i.e., the number of rows) may be reduced by removing rows which have data that can be easily derived from other rows. For example, the table may be reduced to a quarter of the original size by only implementing the case when both $y_1$ and $y_2$ have positive signs. If samples corresponding $y_1$ and $y_2$ do not both have positive signs, the detector may be operative to: make them positive for purposes of making an index; look up the corresponding original phase values from the reduced table; and perform a corrective operation as required to convert the original phase values retrieved from the table to the correct original phase values which correspond to the one or both of the adjusted outputs ($y_1$ and $y_2$) being negative.

As discussed previously, an embodiment of the detector may need to determine original phase angles for only one of the correlation filters. Thus the table may be reduced further by including precalculated original phase data associated with only one correlation filter. As a result the size of the table can be reduced again by half as each row only includes one 16-bit value rather than two 16-bit values. For example, the precalculated original phase angles stored in the table may only be generated using equation 4. However, as will be described below, embodiments may (if needed) determine original phases angles corresponding to equation 5 using a table with only equation 4 data by generating an index to the table with the adjusted y1 and y2 values reversed.

By applying both of the above described reduction techniques, the table size may be reduced from the 256 k bytes to only 32 k bytes. In an embodiment of the detector, the table may be stored in flash RAM or other data store which is accessible to the processor associated with the detector.

In an embodiment of the detector, the floating point outputs of equations 4 or 5 may be mapped to a fixed point integer value for storing in the table by multiplying the phase values in radians produced by equations 4 or 5 by a constant K shown in equation 16.

$$K=9000/\pi \qquad \text{(EQ 16)}$$

Here K is chosen to produce integer values in multiples of 0.02 degrees. Thus an integer value of 50 in the table would correspond to a 1 degree phase angle. In the table, signed integer values ranging from −32,768 to +32,767 can represent phase angles ranging from −655.36° to +655.34°. In an embodiment of the detector, a precalculated table formed in this manner, may cover more than ±3.5 radian which may be sufficient to represent the maximum phase delay caused by a sextuple (6 overlapped sheets).

In the described embodiment in which the table has been reduced by only including rows for the case where the adjusted outputs ($y_1$, $y_2$) are positive, an index (z) for accessing an original phase angle from such a reduced table may be calculated according to equation 17.

$$z=128\cdot w_2+w_1 \qquad \text{(EQ 17)}$$

Here $w_1$ corresponds to the absolute value of $y_1$ (i.e., $|y_1|$) and $w_2$ corresponds to the absolute value of $y_2$ (i.e., $|y_{21}|$). If the table stores precalculated original phase angles generated from equation 4 for example, the variable z corresponds to an index to the table which is operative to locate original phase angle for the first correlation filter.

For embodiments of the detector which also need phase information corresponding to the second correlation filter, the same table (derived using equation 4) may be used but a reverse index ($z_r$) may be calculated according to equation 18.

$$z_r=128\cdot w_1+w_2 \qquad \text{(EQ 18)}$$

Here the indexes z and $z_r$ correspond to left shifting $w_2$ (or $w_1$) by 7 bits and then adding $w_1$ (or $w_2$). To simplify the table further, $w_1$ and $w_2$ may be confined to a range from 0 to 127. If either of them is 128, the value may be reduced to 127. Since the maximum value (i.e., 128) occurs when the detector is in the no sheet condition, the phase information lost may have little impact on the accuracy of the device to distinguish single sheets from multiple sheets.

In an embodiment of the detector, precalculated original phase angles for the described reduced table which are accessed using the above described index z (or $z_r$) may be generated according to the function shown in equation 19.

$$f(z) = f(128 \cdot w_2 + w_1) = int\left[0.5 + \frac{9000}{\pi} \cdot \arccos\frac{w_1}{\sqrt{w_1^2 + w_2^2}}\right] \quad \text{(EQ 19)}$$

A method of producing or manufacturing the detector may include a method step which involves generating the above described table. Such a method may include the method step of forming the reduced table according to equation 19 for combinations of $w_1$ and $w_2$ which range from 0 to 127. The method of producing the detector may further include storing the data for the table in a data store which is accessible by the processor of the detector. A method of operating such a detector may include accessing the table to determine original phase values for one or both correlation filters using indexes generated by the detector according to equation 17 and/or equation 18. Because this described table was reduced by including phase information for only cases where $y_1$ and $y_2$ are both positive, the method of operating the detector may further include a step involved with converting the data retrieved from the table to reflect the original signs of y1 and y2 (if one or more are negative).

For example if $y_1$ is negative, equation 20 may be used to map the value f(z) retrieved from the reduced table at index (z) to a value f(z)* which corresponds to the correct original phase angle associated with the first correlation filter.

$$f(z)^* = 9000 - f(z) \quad \text{(EQ 20)}$$

If the reduced table is accessed using the index ($z_r$) from equation 18 to find phase angle data corresponding to the second correlation filter, then when $y_2$ is negative, equation 21 may be used to map the value $f(z_r)$ retrieved from the table at index ($z_r$) to a value $f(z_r)^*$ which corresponds to the correct original phase angle associated with the second correlation filter.

$$f(z_r)^* = 9000 - f(z_r) \quad \text{(EQ 21)}$$

EXAMPLES

During the operation of the detector the following examples show various combinations of adjusted outputs $y_1$ and $y_2$ and the resulting original phase angles $\phi_1$ and $\phi_2$ in degrees that may be determined by the detector using the phase information f(z) and $f(z_r)$ accessed from the reduced table at the indexes z, $z_r$ calculated from $y_1$ and $y_2$.

Example 1

$y_1=10$, $y_2=100$
$w_1=10$, $w_2=100$
$z=128*100+10=12810$
$z_r=128*10+100=1380$
$f(z)=f(12810)=4214$
$f(z_r)=f(1380)=286$
$\phi_1=f(z)/50=84.29°$
$\phi_2=f(z_r)/50=5.72°$ Here the adjusted outputs ($y_1$, $y_2$) are both positive. Thus the phase angle data for f(z) and $f(z_r)$ accessed from the table does not need to be adjusted by the detector.

Example 2

$y_1=-10$, $y_2=100$
$w_1=10$, $w_2=100$
$z=128*100+10=12810$
$z_r=128*10+100=1380$
$f(z)=f(12810)=4214$
$f(z_r)=f(1380)=286$

Here, since only $y_1$ is negative, only the table value for f(z) must be adjusted according to equation 20 as follows:

$$f^*(z)=9000-f(z)=9000-4214=4786$$

which results in the following original phase angles in units of degrees.

$$\phi_1=f^*(z)/50=95.72°$$

$$\phi_2=f(z_r)/50=5.72°$$

Example 3

$y_1=10$, $y_2=-100$
$w_1=10$, $w_2=100$
$z=128*100+10=12810$
$z_r=128*10+100=1380$
$f(z)=f(12810)=4214$
$f(z_r)=f(1380)=286$

Here, since only $y_2$ is negative, only the table value for $f(z_r)$ must be adjusted according to equation 21 as follows:

$$f^*(z_r)=9000-f(z_r)=9000-286=8714$$

which results in the following original phase angles in units of degrees.

$$\phi_1=f(z)/50=84.29°$$

$$\phi_2=f^*(z_r)/50=174.28°$$

Example 4

$y_1=-10$, $y_2=-100$
$w_1=10$, $w_2=100$
$z=128*100+10=12810$
$z_r=128*10+100=1380$
$f(z)=f(12810)=4214$
$f(z_r)=f(1380)=286$

Here, both $y_1$ and $y_2$ are negative, thus the table values for both f(z) and $f(z_r)$ must be adjusted according to equations 20 and 21 as follows:

$$f^*(z)=9000-f(z)=9000-4214=4786$$

$$f^*(z_r)=9000-f(z_r)=9000-286=8714$$

which results in the following original phase angles in units of degrees.

$$\phi_1=f^*(z)/50=95.72°$$

$$\phi_2=f^*(z_r)/50=174.28°$$

In embodiments of the detector, once at least one of the original phase angles have been determined for a sample using the above described method of looking up the original phase angle from a table, the detector is operative to map the original phase angle to a reconstructed phase angle responsive to the change in signs of the adjusted outputs ($y_1$, $y_2$).

As discussed previously, the detector may only need to determine the original phase angle and corresponding reconstructed phase angle for one correlation filter. However, in alternative embodiments, the detector may be operative to calculate the original phase angles and corresponding reconstructed phase angles for both correlation filters for verification, troubleshooting, and/or debugging purposes.

In described embodiment, the detector may include one or more processors capable of determining reconstructed phase angles according to the previously described methods. However, it is to be understood that in alternative embodiments, one or more processors associated with the ATM or other machine which includes the detector may be operative to determine reconstructed phase angles according to the previously described methods.

Further although the described embodiment of the detector and/or ATM may determine original phase angles responsive to a table of precalculated phase information, in alternative embodiments, the detector and/or ATM may be operative to calculate the original phase angles for each sample using the equations 4, 5 and/or 19.

Figure 24:
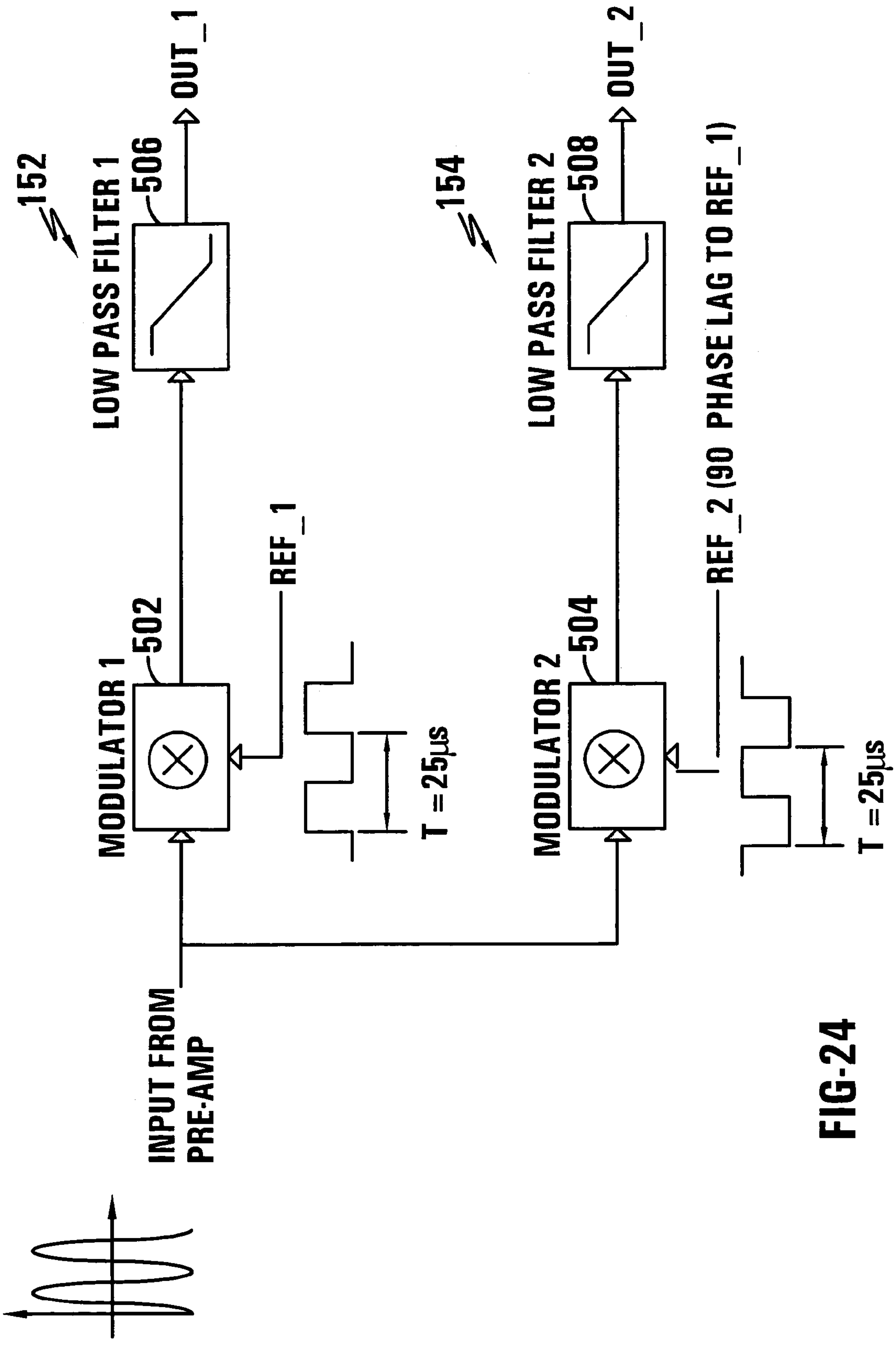
FIG. 24 shows a schematic view of orthogonal correlation filters.

An embodiment of the detector may comprise orthogonal correlation filters configured with two correlation filters 152, 154 as discussed previously with respect to FIG. 4. As shown in FIG. 24, each correlation filter may have a modulator 502, 504 and a low-pass filter 506, 508. As discussed previously, the modulating or reference signals REF_1 and REF_2 fed into the respective modulators are of the same frequency and have a 90 degree phase difference between them. In this described embodiment the modulator may comprise an analog multiplier. Similarly, the low-pass filter may also be of another format and/or with different orders (as the application of the detector may require), and in alternative embodiments may comprise a (synchronized) integrator (with or without sample-hold stage).

Figure 25:
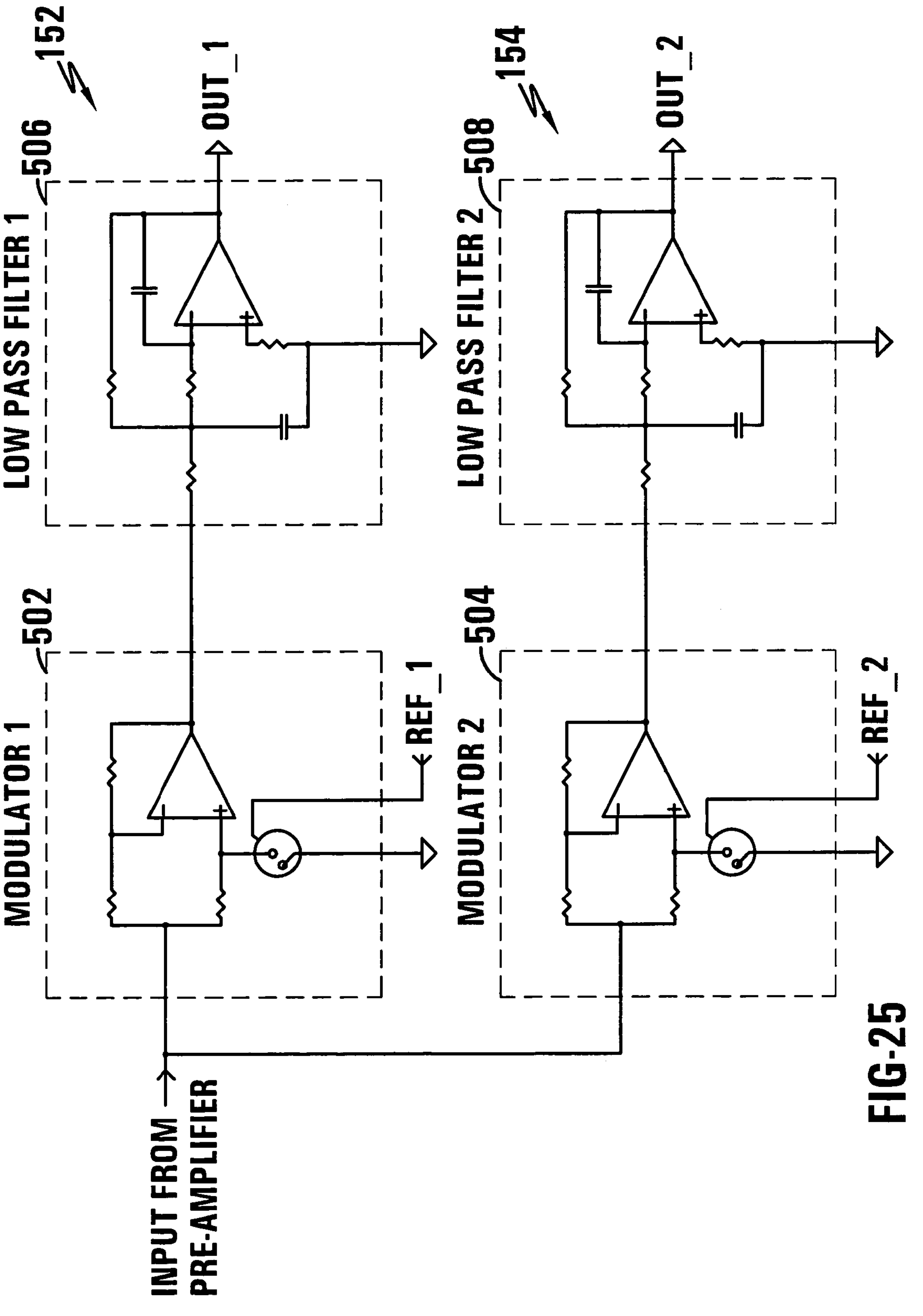
FIG. 25 shows an example of a circuit which comprises the orthogonal correlation filters.

FIG. 25 shows an example of a circuit which may be implemented for use in a relatively low cost embodiment of the orthogonal correlation filters. Here each modulator may be implemented with an analog switch controlled "chopper", having a gain of either +1 (switch closed) or −1 (switch open) depending on whether the logical level of the respective reference signal (REF_1 or REF_2) is '0' or '1'. The reference signals (or the chopping control signals) are logical instead of analog, so that the typically more expensive analog multiplier may be replaced by a relatively low-cost "chopper".

For example with respect to the modulator 502 of the first correlation filter 152, when the switch is open or the control logical level of REF_1 is '0', the modulator has gain of −1. When the switch is closed, or REF_1 is '1', the modulator has gain of 1. A similar functional description corresponds to modulator 504 of the second correlation filter 154. To maintain the "orthogonal property", REF_1 and REF_2 must be of the same frequency and $\pi/2$ radians (90 degrees) apart from each other in phase. As discussed herein, REF_2 is chosen to be lagging REF_1 by $\pi/2$ radians; however, in alternative embodiments, REF_1 may lag REF_2 by $\pi/2$ radians.

The low-pass filters 506, 508 may be implemented in this described embodiment as low-pass filters with second order MFB with negative gain. The conjugate pole pair may be so placed that it has enough attenuation (e.g., more than 60 dB) on the modulation frequency (REF_1 and REF_2) and other problem frequencies.

The described embodiments of the detector apparatus have been shown as being used in deposit accepting apparatuses of automated banking machines. However, it is to be understood that in alterative embodiments, the detector may be incorporated into other sheet handling apparatuses such as currency recycling devices, check handling devices, cash dispensers, printers, copiers, scanners, ATMs, or any other device that processes or transports sheets of paper or other materials. Further the types of sheet media which may be detected for multiple overlapped sheets may include at least one of checks, currency, paper sheets, paper documents, and/or other items capable of enabling an ultrasonic sound wave to pass therethrough.

Computer software instructions used in operating the detector, automated banking machines and connected computers may be loaded from computer readable media or articles of various types into the respective computer processors. Such computer software may be included on and loaded from one or more articles such as diskettes CDs, DVDs or ready only memory devices. Such software may also be included on articles such as hard disk drives, tapes, flash drives, and other non-volatile memory devices. Such software may also be stored in firmware of the detector and/or the automated banking machine or other systems which include the detector. Other articles which include data representative of the instructions for operating computer processors in the manner described herein are suitable for use in achieving operation of the detector, automated banking machine, and/or other systems in accordance with embodiments described herein.

The embodiments of the detector, automated banking machines and/or other systems described herein have been described with reference to particular software components and features. Other embodiments of the invention may include other or different software components which provide similar functionality.

Thus the new automated banking machine ultrasonic detector apparatus and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the embodiments included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An apparatus comprising:

a sound transmitter, operative to transmit a sound signal through a pathway;

a sound receiver operative to produce at least one receiver signal responsive to the sound signal after having passed through the pathway;

a first correlation filter and a second correlation filter, wherein the first correlation filter is operative responsive to the at least one receiver signal and a first reference signal to generate a first output representative of a difference in phase with respect to the at least one receiver signal and the first reference signal, wherein the second correlation filter is operative responsive to the at least one receiver signal and a second reference signal to generate a second output representative of a difference in phase with respect to the at least one receiver signal and the second reference signal, wherein the second reference signal lags in phase relative to the first reference signal;

at least one processor, wherein the at least one processor is operative responsive to changes in the first and the second outputs of the correlation filters to determine information representative of a phase delay produced in the sound signal responsive to the sound signal passing through sheet media in the pathway, wherein the at least one processor is operative to distinguish between sheet media in the pathway that corresponds to a single sheet and sheet media in the pathway that corresponds to multiple sheets responsive to the information representative of phase delay.

2. The apparatus according to claim 1, wherein the second reference signal lags in phase relative to the first reference signal by substantially ninety degrees.

3. The apparatus according to claim 2, wherein the at least one processor is operative responsive to the first and second outputs to determine original phase information associated with at least one of the correlation fillers, wherein the original phase information associated with the at least one of the correlation filters includes a plurality of original phase angle values, wherein the at least one processor is operative to determine reconstructed phase angle values from the plurality of original phase angle values responsive to changes in the first and second outputs, wherein the reconstructed phase angle values are representative of a phase delay of the sound signal, wherein the at least one processor is operative to distinguish between a single sheet and multiple sheets responsive to the reconstructed phase angle values.

4. The apparatus according to claim 3, wherein the at least one processor is operative to determine reconstructed phase angle values representative of a phase delay associated with the sound signal which is greater than 180 degrees.

5. The apparatus according to claim 3, wherein the at least one processor is operative responsive to the reconstructed phase angle values to distinguish a single sheet from a triple overlapped sheet in the pathway.

6. The apparatus according to claim 3, wherein the at least one processor is operative to determine that a first sample of at least one of the first and second outputs is associated with a first reconstructed phase angle that falls within a first about ninety degree span of angles, wherein the at least one processor is operative to detect a change in at least one of the first and second outputs which indicates that a second subsequent reconstructed phase angle falls within a second about ninety degree span of angles which is adjacent to the first span, wherein the at least one processor is operative responsive to the detected change to determine the second subsequent reconstructed phase angle.

7. The apparatus according to claim 3, further comprising a data store including data corresponding to a table of precalculated original phase angle values, wherein the at least one processor is operative to determine the original phase angle values from the table using an index to the table, wherein the at least one processor is operative to determine the index responsive to the first and second outputs of the first and second correlation filters.

8. The apparatus according to claim 1, wherein the at least one processor is operative to acquire a first pair of output values associated with a first sample of the first and second outputs, wherein the at least one processor is operative to determine that the first sample is associated with a phase angle that falls within a first about ninety degree span of angles, wherein the at least one processor is operative to acquire a second pair of output values associated with a second sample of the first and second outputs, wherein the second sample follows the acquisition of the first sample in time, wherein the at least one processor is operative to compare the second pair of output values and the first pair of output values, wherein the at least one processor is operative to determine reconstructed phase information associated with the second sample responsive to the at least one processor determining that the second sample is associated with a phase angle that falls within a second about ninety degree span of angles, which second span is adjacent to the first span, wherein the at least one processor is operative to distinguish between sheet media in the pathway that corresponds to a single sheet and sheet media in the pathway that corresponds to multiple sheets responsive to the reconstructed phase information.

9. The apparatus according to claim 1, further comprising an automated banking machine, wherein the automated banking machine includes a cash dispenser, at least one transport operative to move sheet media through the pathway, the sound transmitter, the sound receiver, the first and second correlation filters, and the at least one processor.

10. The apparatus according to claim 9, wherein the automated banking machine includes a deposit accepting apparatus operative to accept checks, wherein the deposit accepting apparatus includes the at least one transport, wherein the automated banking machine is operative to perform a check deposit transaction responsive to a check received in the deposit accepting apparatus, wherein the at least one processor is operative to distinguish between single checks and multiple overlapped checks, and wherein the at least one processor is operative to cause the at least one transport to move checks determined by the at least one processor to correspond to multiple overlapped checks to outside of the machine.

11. The apparatus according to claim 1, wherein the frequencies of the at least one receiver signal, first reference signal and second reference signal are substantially the same.

12. The apparatus according to claim 1, wherein the sound transmitter is operative to transmit a sound signal through the pathway, wherein the sound signal has an ultrasonic frequency.

13. The apparatus according to claim 1, wherein the at least one processor is operative responsive to the changes in the first and the second outputs of the correlation filters to determine the information representative of the phase delay, when the changes occur during a time period when the sound signal does not pass through the sheet media and when the sound signal passes through the sheet media.

14. The apparatus according to claim 1, wherein during a time period in which the sound signal passes through no sheet media in the pathway, and in which the sound signal passes through sheet media comprising at least three overlapped sheets in the pathway, the first correlation filter is operative to generate the first output which is representative of phase information which does not vary by more than 180 degrees, wherein during the time period the second correlation filter is operative to generate the second output which is representative of phase information which does not vary by more than 180 degrees, wherein during the time period, the information representative of phase delay produced in the sound signal varies by more than 180 degrees.

15. The apparatus according to claim 1, wherein the at least one processor is operative to compare the information representative of phase delay and a predetermined threshold, wherein the at least one processor is operative responsive to the comparison to generate a signal indicative of the sheet media including more than one sheet.

16. A method comprising:

a) directing a sound signal through sheet media moving in a pathway;

b) producing a receiver signal responsive to the sound signal, wherein at least a portion of the at least one receiver signal is produced responsive to the sound signal after having passed through the sheet media;

c) through operation of a first correlation filter, generating responsive to the at least one receiver signal and a first reference signal, a first output representative of a difference in phase with respect to the at least one receiver signal and the first reference signal;

d) through operation of a second correlation filter, generating responsive to the at least one receiver signal and a second reference signal, a second output representative of a difference in phase with respect to the at least one receiver signal and the second reference signal, wherein the second reference signal lags in phase relative to the first reference signal;

e) responsive to changes in the first and second outputs, determining information representative of a phase delay produced in the sound signal; and f) determining whether the sheet media in the pathway corresponds to at least one of a single sheet and multiple sheets responsive to the information representative of phase delay.

17. The method according to claim 16, wherein in (c) and (d) the second reference signal lags in phase relative to the first reference signal by substantially ninety degrees.

18. The method according to claim 17, wherein (e) comprises:

g) acquiring a first pair of output values associated with a first sample of the first and second outputs;

h) determining that the first sample is associated with a phase angle that falls within a first about ninety degree span of angles;

i) acquiring a second pair of output values associated with a second sample of the first and second outputs, wherein the second sample follows the acquisition of the first sample in time;

j) comparing the second pair of output values and the first pair of output values;

k) determining responsive to (j) that the second sample is associated with a phase angle that falls within a second about ninety degree span of angles, which second span is adjacent to the first span;

l) determining responsive to (k) reconstructed phase information associated with the second sample; and wherein (f) includes determining whether the sheet media in the pathway corresponds to at least one of a single sheet and multiple sheets responsive to the reconstructed phase information.

19. The method according to claim 16, further comprising:

g) determining original phase angle values responsive to the first and second outputs of the correlation filters;

wherein (e) includes determining reconstructed phase angle values from the original phase angle values responsive to changes in the first and second outputs, wherein the reconstructed phase angle values are representative of the phase delay of the sound signal, wherein the at least one processor is operative to distinguish between a single sheet and multiple sheets responsive to the reconstructed phase angle values.

20. The method according to claim 19, wherein in (a) the sheet media corresponds to three overlapped sheets, wherein in (e) at least a portion of the reconstructed phase angle values represent a phase delay associated with the sound signal which is greater than 180 degrees.

21. The method according to claim 20, wherein the original phase angle values which correspond to the portion of the reconstructed phase angle values do not exceed 180 degrees.

22. The method according to claim 19, further comprising:

h) generating indexes to a table of precalculated original phase angle values responsive to the first and second outputs of the first and second correlation filters;

wherein in (g) the original phase angle values are determined from the table using the indexes.

23. The method according to claim 19, wherein (e) includes determining that phase angle values in a portion of the original phase angle values sequentially increase from corresponding to a first about ninety degree span of angles to corresponding to a second about ninety degree span of angles which is adjacent to the first span.

24. The method according to claim 16, wherein in (a) a deposit accepting apparatus of an automated banking machine induces the pathway, wherein the automated banking machine includes a cash dispenser.

25. The method according to claim 24, wherein in (a) the sheet media corresponds to a single check, wherein in (f) the sheet media is determined to correspond to a single sheet, further comprising:

g) reading micr information from the check;

h) performing a check deposit transaction using the micr information; and i) operating at least one sheet transport in the machine to move the check to a storage location in the machine.

26. The method according to claim 25, wherein in (a) the sheet media corresponds to at least two overlapped checks, wherein in (f) the sheet media is determined to correspond to at least two overlapped checks, further comprising:

j) operating the at least one sheet transport to move the check to be accessible outside the machine.

27. The method according to claim 16, wherein in (a) the sound signal has an ultrasonic frequency.

28. The method according to claim 16, wherein in (b) at least a portion of the at least one receiver signal is produced responsive to the sound signal after having passed through the pathway without passing through sheet media.

29. A method comprising:

a) directing a sound signal through sheet media moving in a pathway;

b) producing at least one receiver signal responsive to the sound signal, wherein at least a portion of the at least one receiver signal is produced responsive to the sound signal after having passed through the sheet media;

c) using first and second correlation filters to provide first and second outputs representative of phase information responsive to the at least one receiver signal;

d) acquiring a first pair of output values associated with a first sample of the first and second outputs;

e) determining that the first sample is associated with a phase angle that falls within a first about ninety degree span of angles;

f) acquiring a second pair of output values associated with a second sample of the first and second outputs, wherein the second sample follows the acquisition of the first sample in time;

g) comparing the second pair of samples and the first pair of samples;

h) determining responsive to (g) that the second sample is associated with a phase angle tat falls within a second about ninety degree span of angles, which second span is adjacent to the first span;

i) determining responsive to (h) reconstructed phase information associated with the second sample; and j) determining whether the sheet media in the pathway corresponds to at least one of a single sheet and multiple sheets responsive to the reconstructed phase information.

30. The method according to claim 29, wherein in (c) the first correlation filter is operative responsive to the at least one receiver signal and a first reference signal to generate the first output, wherein the second correlation filter is operative responsive to the at least one receiver signal and a second reference signal to generate the second output, wherein the second reference signal lags the first reference signal in phase by substantially ninety degrees, wherein the first output is representative of a difference in phase between the at least one receiver signal and the first reference signal, wherein the second output is representative of a difference in phase between the at least one receiver signal and the second reference signal.

31. The method according to claim 30, further comprising:

k) prior to (i) determining original phase information responsive to the second pair of output values, wherein (i) includes mapping the original phase information to the reconstructed phase information responsive to (h).

32. The method according to claim 31, wherein (k) includes generating an index to a table of precalculated original phase angle values responsive to the second pair of output values, wherein in the original phase information is determined from the table using the index.

33. The method according to claim 29, wherein in (a) a deposit accepting apparatus of an automated banking machine includes the pathway, wherein the automated banking machine includes a cash dispenser.

34. The method according to claim 29, wherein in (a) the sound signal has an ultrasonic frequency.

35. The method according to claim 29, wherein in (b) at least a portion of the at least one receiver signal is produced responsive to the sound signal after having passed through the pathway without passing through sheet media.

36. An apparatus comprising:

a sound transmitter operative to transmit a sound signal through a pathway;

a sound receiver operative to produce at least one receiver signal responsive to the sound signal after having passed through the pathway;

a first filter and a second filter, wherein the first filter is operative responsive to the at least one receiver signal and a first reference signal to generate a first output representative of a difference in phase with respect to the at least one receiver signal and the first reference signal, wherein the second filter is operative responsive to the at least one receiver signal and a second reference signal to generate a second output representative of a difference in phase with respect to the at least one receiver signal and the second reference signal, wherein the first and second reference signals differ in phase;

at least one processor, wherein the at least one processor is operative responsive to changes in the first and the second outputs of the first and second filters to determine information representative of a phase delay produced in the sound signal responsive to the sound signal passing through sheet media in the pathway, at least one transport, wherein the at least one transport is operative to move the sheet media responsive to the determined information representative of the phase delay produced in the sound signal.

37. The apparatus according to claim 36, wherein the first and second reference signals differ in phase by substantially ninety degrees.

38. The apparatus according to claim 36, wherein the at least one processor is operative responsive to changes in the first and the second outputs of the first and second filters to determine information representative of a phase delay produced in the sound signal which is greater than 180 degrees.

39. The apparatus according to claim 36, wherein the at least one processor is operative to distinguish between sheet media in the pathway tat corresponds to a single sheet and sheet media in the pathway that corresponds to multiple sheets responsive to the information representative of phase delay produced in the sound signal.

40. A method comprising:

a) directing a sound signal through sheet media moving in a pathway;

b) producing a receiver signal responsive to the sound signal, wherein at least a portion of the at least one receiver signal is produced responsive to the sound signal after having passed through the sheet media;

c) through operation of a first filter, generating responsive to the at least one receiver signal and a first reference signal, a first output representative of a difference in phase with respect to the at least one receiver signal and the first reference signal;

d) through operation of a second filter, generating responsive to the at least one receiver signal and a second reference signal, a second output representative of a difference in phase with respect to the at least one receiver signal and the second reference signal, wherein the first and second reference signals differ in phase;

e) responsive to changes in the first and second outputs, determining information representative of a phase delay produced in the sound signal; and f) operating at least one transport to move the sheet media responsive to the information determined in (c).

41. The method according to claim 40, wherein in (c) and (d) the first and second reference signals differ in phase by substantially ninety degrees.

42. The method according to claim 40, wherein (e) includes responsive to changes in the first and second outputs, determining information representative of a phase delay produced in the sound signal that is greater than 180 degrees.

43. The method according to claim 40, wherein (f) includes determining whether the sheet media in the pathway corresponds to at least one of a single sheet and multiple sheets responsive to the information representative of phase delay.

44. A method comprising:

a) directing a sound signal through sheet media moving in a pathway;

b) producing at least one receiver signal responsive to the sound signal, wherein at least a portion of the at least one receiver signal is produced responsive to the sound signal after having passed through the sheet media;

c) producing a first output representative of changes in phase of the at least one receiver signal relative to a first reference signal;

d) producing a second output representative of changes in phase of the at least one receiver signal relative to a second reference signal, wherein the first and second reference signals differ in phase;

e) acquiring a first pair of output values associated with a first sample of the first and second outputs;

f) acquiring a second pair of output values associated with a second sample of the first and second outputs, wherein the second sample follows the acquisition of the first sample in time;

g) comparing the second pair of samples and the first pair of samples; and h) responsive to (g), operating at least one transport to move the sheet media.

45. The method according to claim 44, wherein in (c) and (d) the first and second reference signals differ in phase by substantially ninety degrees.

46. The method according to claim 44, wherein (g) includes determining data representative of a change in a phase of the sound signal that is more than 180 degrees.

47. The method according to claim 44, wherein (g) includes determining whether the sheet media in the pathway corresponds to at least one of a single sheet and multiple sheets.

* * * * *